US012094488B2

(12) United States Patent
Mallinson

(10) Patent No.: US 12,094,488 B2
(45) Date of Patent: Sep. 17, 2024

(54) LOW POWER VOICE ACTIVITY DETECTOR

(71) Applicant: SiliconIntervention Inc., Kelowna (CA)

(72) Inventor: A. Martin Mallinson, Kelowna (CA)

(73) Assignee: SiliconIntervention Inc., Kelowna (CA)

( * ) Notice: Subject to any disclaimer, the term of this patent is extended or adjusted under 35 U.S.C. 154(b) by 200 days.

(21) Appl. No.: 17/971,626

(22) Filed: Oct. 23, 2022

(65) Prior Publication Data

US 2024/0135958 A1 Apr. 25, 2024
US 2024/0233751 A9 Jul. 11, 2024

Related U.S. Application Data

(60) Provisional application No. 63/418,533, filed on Oct. 22, 2022.

(51) Int. Cl.
*G10L 25/78* (2013.01)

(52) U.S. Cl.
CPC .................................... *G10L 25/78* (2013.01)

(58) Field of Classification Search
None
See application file for complete search history.

(56) References Cited

U.S. PATENT DOCUMENTS 5,617,508 A * 4/1997 Reaves .................. G10L 25/87 704/214
7,117,145 B1 * 10/2006 Venkatesh ........... G10L 21/0208 704/200
8,548,803 B2 * 10/2013 Bradley .................. G10L 25/03 704/218
2002/0178012 A1 * 11/2002 Wang .................... G10L 19/005 704/503
2006/0100868 A1 * 5/2006 Hetherington ...... G10L 21/0208 704/226
2010/0280827 A1 * 11/2010 Mukerjee ................ G10L 25/93 704/236
2011/0264447 A1 * 10/2011 Visser ..................... G10L 25/78 704/208
2016/0112022 A1 * 4/2016 Butts ........................ H04R 1/10 381/100
2017/0212235 A1 * 7/2017 Qiu ......................... G01S 15/42

FOREIGN PATENT DOCUMENTS

TW 200304119 A * 9/2003 ............ G10L 13/04

* cited by examiner

*Primary Examiner* — Neeraj Sharma
(74) *Attorney, Agent, or Firm* — Gard & Kaslow LLP

(57) ABSTRACT

An apparatus and method for voice activity detection. A multiphase differential output rotating capacitive sampler achieves a frequency down conversion over as many specific frequency bands as are required for analysis. A chirp is created in the rotating sampler as the sum of arbitrary frequencies across the desired analysis band multiplied by a window function. The chirp is sampled at a rate of rotation synchronous with the last state of burst of the chirp, allowing a non-phase synchronous pattern in the coefficient values and allowing a high-Q and arbitrary decomposition of the signal. After the sample is taken, the next clock signal to the sampler is used to define the output voltage of the sampler by shorting the output, which is entirely capacitive, to ground. Processing occurs in the analog domain rather than digitally, avoiding the need for FFTs and allowing for greater speed and lower power consumption.

14 Claims, 28 Drawing Sheets

1500

3200

LOW POWER VOICE ACTIVITY DETECTOR

This application claims priority from Provisional Application No. 63/418,533, filed Oct. 22, 2022, which is incorporated by reference herein in its entirety.

FIELD OF THE INVENTION

The present invention relates generally to signal detection, and more specifically to the detection of signals representing human voice.

BACKGROUND OF THE INVENTION

Circuits and methods to perform voice activity detection (VAD) are known in the art. In general, such circuits and methods rely upon a digital computer running a program to determine whether the amount of "entropy," or disorder, that is present in a frequency band considered the most likely to contain voice information is great enough to indicate speech. The bands that will be of interest are well known in the prior art; for example, the frequency of speech is about 80 to 185 hertz (Hz) Hz in adult men and about 165 to 255 Hz in adult women, although in a specific case the specific frequency band of interest may vary slightly with the language being spoken.

Many of these circuits and methods use fast Fourier transforms ("FFTs") to perform some of the needed calculations. One problem is that the shortest time in which a digital system can perform an FFT is about 20 milliseconds (ms). This is not considered to be fast enough for some applications. One prior art solution to this problem is to have several FFTs that overlap in frequency response running simultaneously. This obviously necessitates additional complexity and power consumption.

It is desirable to perform VAD faster and with lower power consumption than in presently available circuits and methods.

SUMMARY OF THE INVENTION

Described herein is an apparatus and method for performing voice activity detection (VAD) more quickly and with lower power consumption than in presently available circuits and methods.

One embodiment discloses an apparatus for performing voice activity detection on a plurality of input signals, comprising: a multiphase differential output rotating capacitive sampler configured to achieve a frequency down conversion over a plurality of frequency bands and to sample the plurality of input signals at a plurality of phases, the samples taken synchronously with the end of a chirp that is a sum of arbitrary frequencies across the plurality of frequency bands multiplied by a window function; an amplitude detecting circuit configured to detect minimum and maximum values of the samples of the plurality of input signals in each frequency band and to determine a derivative of the samples; a comparator configured to determine that a total energy in the plurality of input signals in any of the frequency bins based upon a derivative of the amplitude is great enough to indicate the presence of speech; and a switch configured to short the output to ground after each set of samples of the input signals is taken.

Another embodiment discloses a method of performing voice activity detection on a plurality of input signals, comprising: creating a multiphase differential output rotating capacitive sampler configured to achieve a frequency down conversion over a plurality of frequency bands and to sample the input signals at a plurality of phases; creating a chirp in the rotating capacitive sampler as the sum of arbitrary frequencies across the plurality of frequency bands multiplied by a window function; sampling the input signals synchronous with an end of the chirp; determining an amplitude of the input signals in each of the plurality of frequency bins and a derivative of the amplitude in each of the frequency bins; determining that a total energy in the input signals in each of the frequency bins based upon the derivative of the amplitude is great enough to indicate the presence of a voice; and restoring a voltage offset by shorting any output to ground after each set of samples is taken.

DETAILED DESCRIPTION OF THE INVENTION

Figure 1:
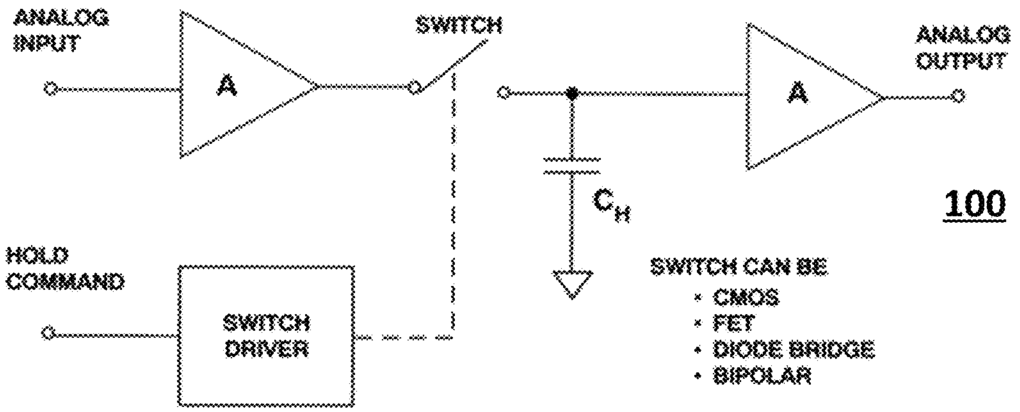
Fig. 1 (Prior art)
FIG. 1 is a diagram of a simple input signal sampler as is known in the prior art.

Described herein is an apparatus and method for performing voice activity detection (VAD) quickly and using low power. The present approach seeks to improve upon the speed and power consumption of prior art methods and circuits.

As above, it is the presence of entropy, or disorder, present in one or more particular frequency bands that indicates that speech information may be present. While prior art methods utilize a digital computer and FFTs, in the present approach an analog computer measures the disorder present in the absolute value of the derivative of the amplitude of an audio MEL-spaced frequency decomposition of the applied signal. (The MEL scale is a perceptual scale of pitches judged by listeners to be equal in distance from one another that originated in the 1930's and is well known.) A threshold is applied to the total disorder above which a digital output is set to indicate speech is likely to be present in the signal.

The rate of calculation of the disorder in the signal and assessment of voice present is equal to the time of the lowest frequency analyzed. Thus, if the lowest MELS frequency bin is 250 Hz, the rate of output assessment from the VAD is 4 ms. The total power consumed (while the power is on continuously, not reduced by cycling the system on and off) is expected to be 3 microwatts (μW). (The power estimates herein assume circuits capable of processing sixteen MEL bands.)

The present approach achieves this by using a multiphase differential output rotating capacitive sampler to achieve a frequency down conversion over as many specific frequency bands as are required for analysis (again, presumed to be sixteen herein). The rotating capacitive sampler uses an aggregation of bottom plate samplers, each comprising two capacitors and a switch. As above, the capacitors are selected according to the desired frequency bands and window function.

The aggregated circuit provides two outputs, one from positive capacitor values and one from nominally negative (inverted input) capacitor values corresponding to a negative impulse response term, connected in multiple FETs to create both a minimum and maximum tracking circuit, which are combined in a long-tailed pair. The output is used as the amplitude of the multiple input signals. A capacitor may couple the current into the long-tailed pair to further reduce current consumption.

A chirp is created in the rotating capacitive sampler as the sum of arbitrary frequencies across the desired analysis band multiplied by a window function such as a Kaiser window function. For example, to analyze 1 kHz to 1.3 kHz, a summation of 1, 1.1, 1.2 and 1.3 kHz or similar values are added in the code and multiplied by the Kaiser window function, indexed by the position of the coefficient in the sequence of individual samplers. This results in a sharply defined flat top arbitrary frequency selection. This requires no additional complexity as the same capacitors must be programmed or selected independent of how complex the math is, but the window function is the means to determine the capacitor values that form the impulse response in the rotating capacitive sampler.

The chirp that is created by the action of the rotating capacitive sampler is sampled at a rate of rotation synchronous with the last state of burst of the chirp, allowing a non-phase synchronous pattern in the coefficient values and enabling the window function to produce a sharp (high "Q") and arbitrary frequency decomposition of the signal.

After the sample is taken synchronous with the end of the burst, the next time step, or "clock" to the rotating capacitive sampler is used to define the output voltage of the rotating capacitive sampler by shorting the output, which is entirely capacitive, to ground. This does not consume any average current and prevents any leaking (in the pico-amp level) from slowly causing a DC drift.

The output samples from the three phases taken at the end of the chirp are applied to a novel amplitude calculating circuit consisting of a complex interconnection of standard digital FETS. No special analog device is needed, but rather the provided digital devices of the process are used. The complex interconnection of FETs has two results. First, it results in an averaging of the variation of the of the digital devices, thereby allowing them to operate as viable analog elements. Second, it creates a circuit responsive to the absolute value of the combined three phases so that it tracks the envelop of the three phases, so that its output is proportional to the signal in the band of the frequency resolver.

The derivative of the signal present in each band is summed with a weight representing the typical human speech in that band. For example, the derivative of tones in the region of 1 kHz is weighted greater than other regions. The derivative is used so that a stationary spectrum will not trigger the VAD, but rather the VAD will only respond when the spectral output is changing and will not respond to the constant hum of a machine or a similar constant noise.

In the circuit design described herein, i.e., with sixteen channels each being a three-phase rotating capacitive sampler of arbitrary frequency, no current is needed from the analog power supply. Rather, the entire circuit functions on the approximately 500 nanoamps (nA) that it draws from the inputs. Thus, when the inputs cease to move, zero current is drawn from the inputs. The only current then consumed is that of the digital round-robin sample switch controller. This is a digital state machine clock at between 30 kHz and 50 kHz. When made on an advanced manufacturing process this digital state machine is expected to consume less than 1 W from the digital supply.

The amplitude calculating circuit again consumes zero static power, only capacitive power, proportional to the rate of operation. This is achieved by causing the charge stored on a capacitor (recharged at the VAD output rate, typically 4 mS) to flow in the network and accumulating the charge received at the two output ports of the complex network amplitude calculator. The charge difference accumulated is the signal amplitude in the band.

Sampling analog signals is well known in the prior art. In the simplest form, sampling an input signal is performed by using a switch to connect an input signal to some processing circuit at an interval. FIG. 1 is a diagram of a simple input signal sampler 100 as is known in the prior art. The switch is controlled by a switch driver, which may be, for example, a timer or a logic circuit.

Figure 2:
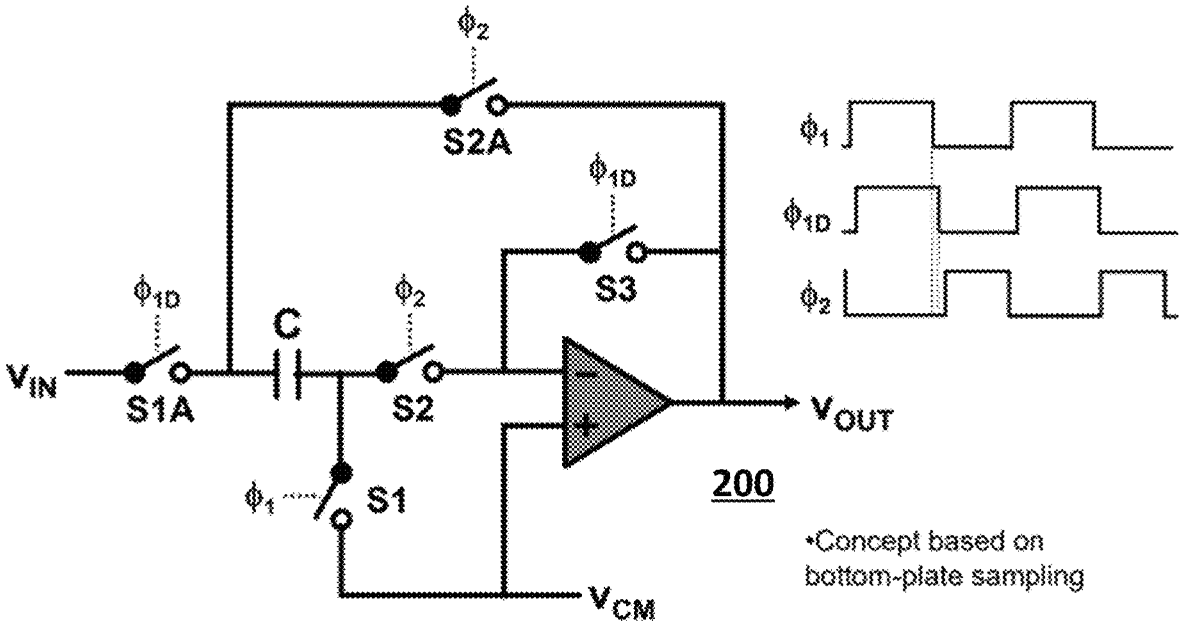
Fig. 2 (Prior art)
FIG. 2 is a diagram of a bottom plate sampler as is known in the prior art.

FIG. 2 is a diagram of a bottom plate sampler 200 as is known in the prior art. In bottom plate sampler 200, switches S1 is controlled by signal Φ1, switch S2 by signal Φ2, and switches S1A and S3 by signal Φ1D. As is known in the art, a bottom plate sample has no error due to, for example, a change in the charge injection due to a change in the input voltage level.

Figure 3:
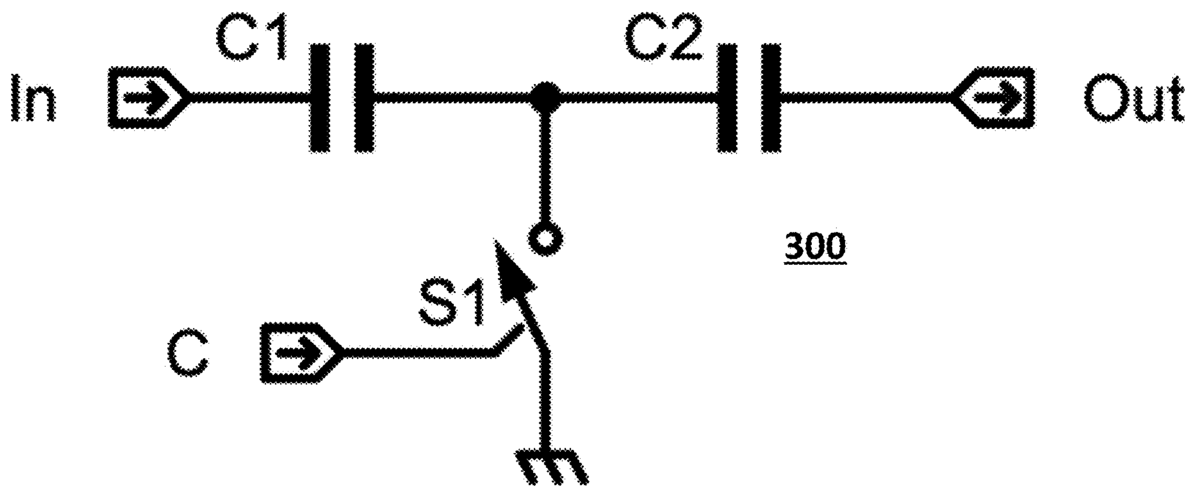
Fig. 3 (Prior art)
FIG. 3 is a diagram of a bottom plate sampler with no op-amp as is known in the prior art.

FIG. 3 is a diagram of a bottom plate sampler 300 with no op-amp as is known in the prior art. Bottom plate sampler is comprised of capacitors C1 and C2, and switch S1. Switch S1 is operated by a control signal C. When control signal C closes switch S1, the value of the voltage at the input In is set across C1; as the signal applied at In changes, the output changes as well. In effect, the DC offset is set to be the signal at the moment of sampling.

Figure 4:
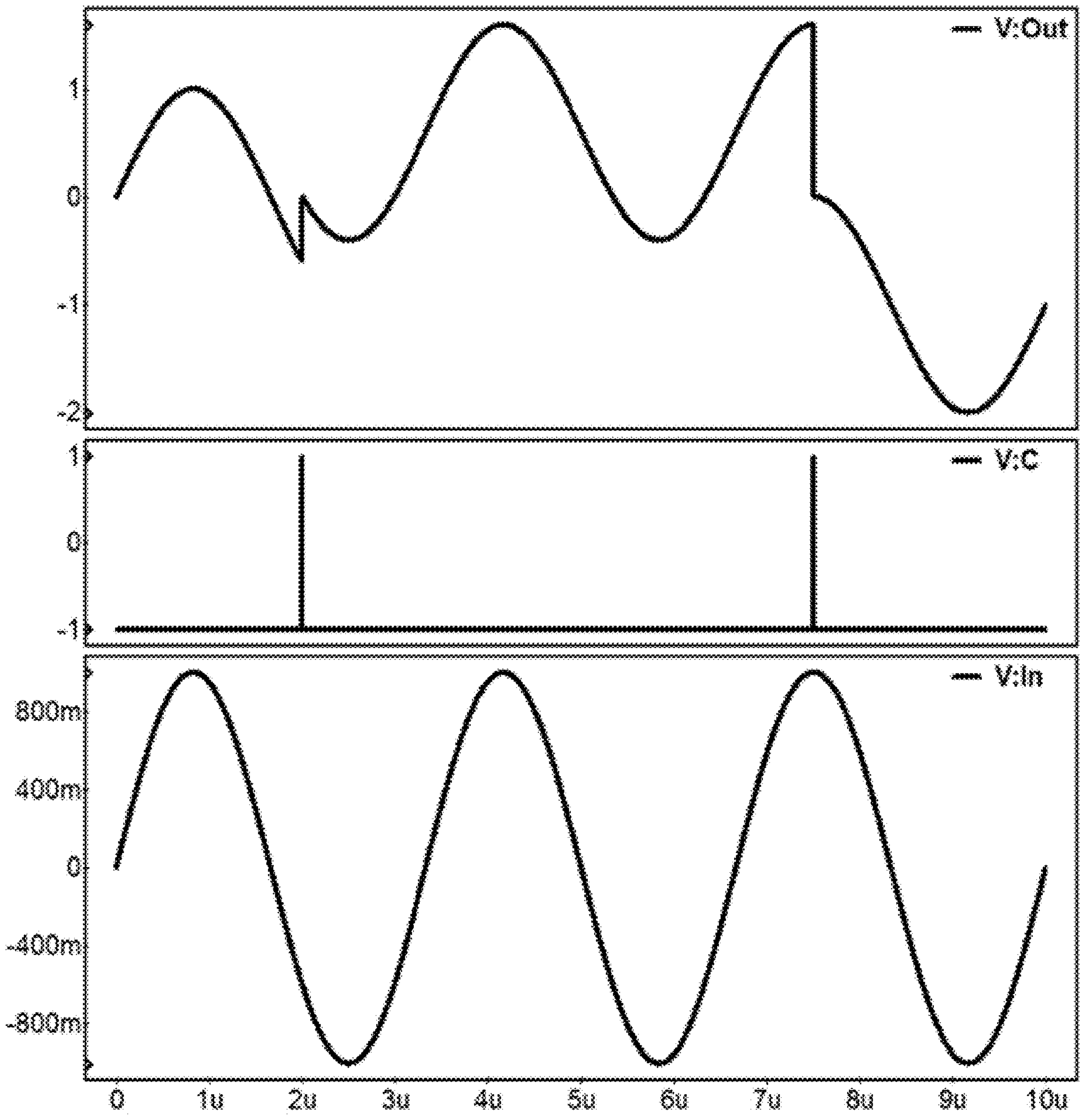
FIG. 4 shows how a bottom plate sample is obtained by the circuit of FIG. 3.

FIG. 4 shows how a bottom plate sample is obtained by the circuit of FIG. 3. The lower graph shows voltage in the form of a sine wave applied at the input In. The middle graph shows a voltage that is the control signal C that causes switch S1 to close. The upper graph shows the output voltage Out.

Figure 5:
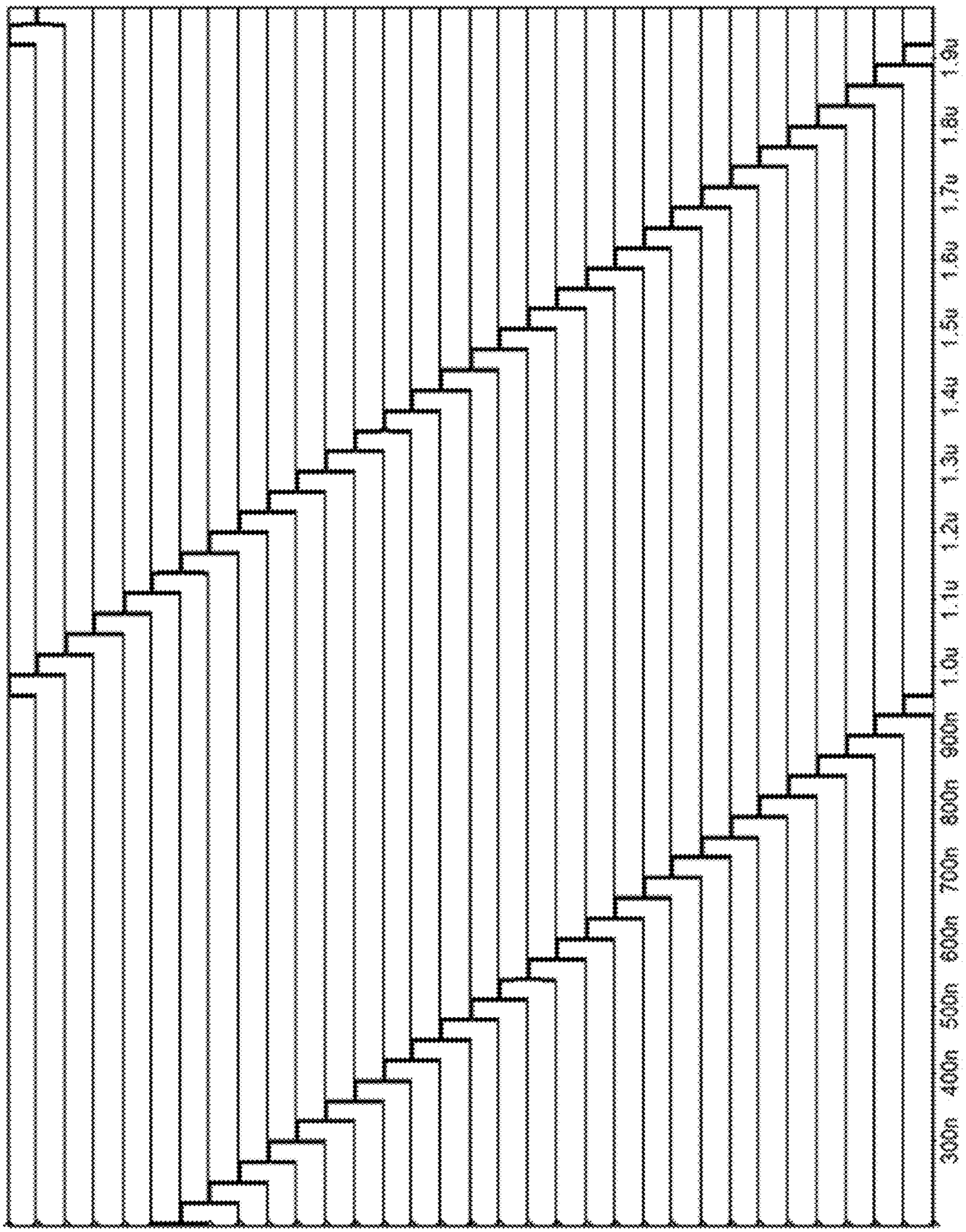
FIG. 5 is a graph showing how an aggregation of bottom plate samples is obtained at different times according to one embodiment of the present approach.

A first step in the present approach is to replicate the simple bottom plate sampler 300 of FIG. 3 multiple times, sharing a common input and a common output, but sampling in sequence from a sequence of pulses. This may be considered a “one-hot” sequence since each pulse causes a sample at a different point in time. FIG. 5 is a graph showing how an aggregation of bottom plate samples is obtained at different times according to one embodiment of the present approach.

Figure 6:
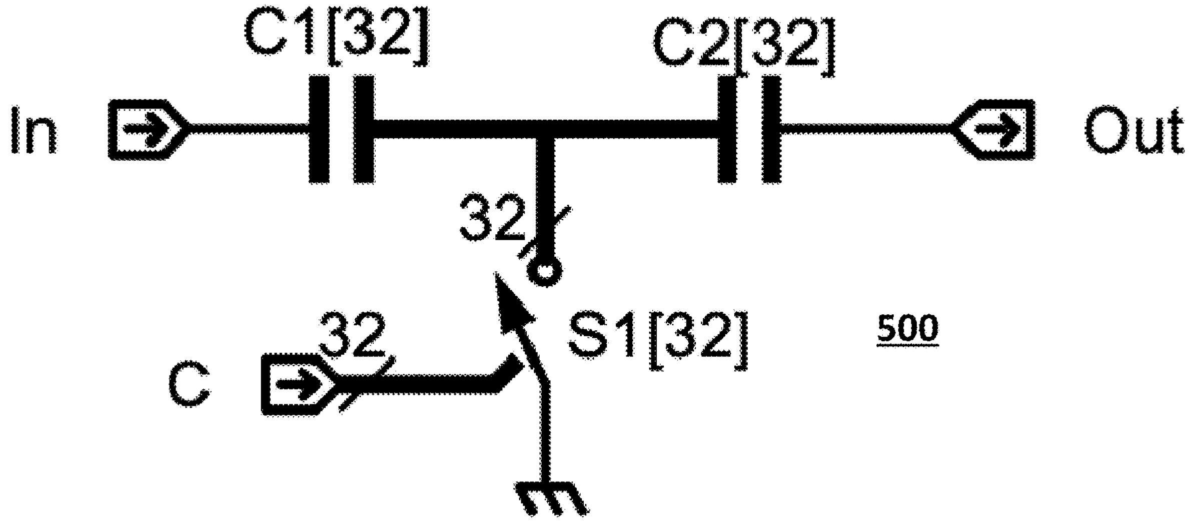
FIG. 6 is a diagram of a bottom plate sampler that obtains multiple samples according to the present approach.

FIG. 6 is a diagram of a bottom plate sampler 600 that obtains multiple samples according to the present approach. Bottom plate sampler 600 replicates 32 instances of bottom plate sampler 300 of FIG. 3, corresponding to the 32 samples taken in each cycle shown in FIG. 5.

Since the samples now overlap, the output is the input samples at 32 times the previous rate. This is shown in FIG. 7, a graph showing the effect of multiple samples in parallel according to the present approach.

Figure 7:
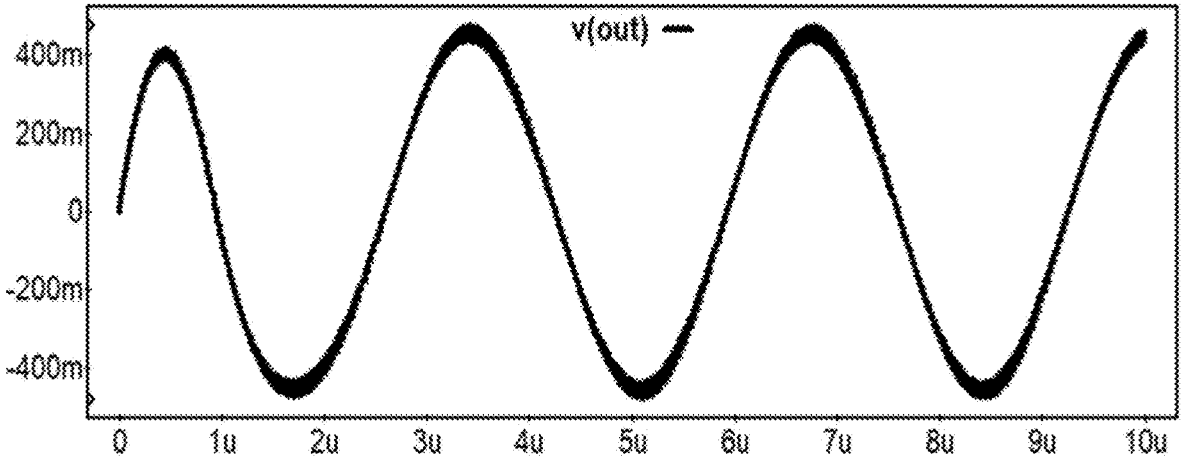
FIG. 7 is a graph showing the effect of multiple samples in parallel according to according to one embodiment of the present approach.

If the values of the C2 capacitors in circuit 600 are varied in a sinusoidal pattern, the circuit becomes frequency sensitive so that its output varies with the frequency applied to the input (relative to the rate of the one-hot pulses of FIG. 7 and the number of sinusoids in the capacitor pattern). This is illustrated in FIG. 8.

Figure 8:
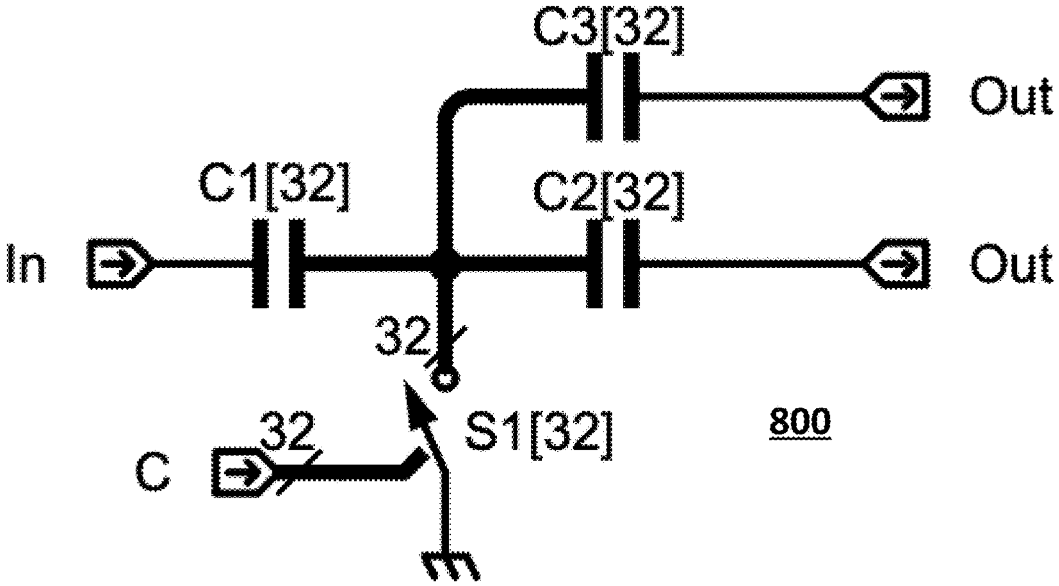
FIG. 8 is a diagram of a circuit for differential aggregation of bottom plate samplers according to one embodiment of the present approach.

FIG. 8 is a diagram of a circuit 800 that is differential aggregation of bottom plate samplers according to the present approach. Circuit 600 of FIG. 6 is modified by adding another 32 capacitors that provide an inverted output Outbar (shown in FIG. 8 as Out with a bar over it). This creates a differential circuit that supports positive and negative capacitor values.

The values of capacitors C2 and C3 in circuit 800 vary sinusoidally, but when the capacitor values would be negative they are not created. Consequently, the output Out collects the positive terms of the output and Outbar collects the negative terms.

To assist in setting values on a complex array of elements, some schematic programs support several methodologies of defining component values. These include simply listing the values, calling for an arbitrary function and passing to that function the context and iteration instance, and finally, and perhaps the easiest method, looking within a document (i.e., file or dataset) containing the component values, such as an Excel spreadsheet or other document.

In some schematic tools an Excel spreadsheet or other document may be opened within the tool and is accessible as a data object. Thus, the schematic tool does not parse a textual representation of the Excel or other file, but rather opens it and accesses it at an API level. This allows a schematic tool with this capability to seek in any specified sheet for some indication of the name of the device, such as bold text as a column header with the same name as the device. Table 1 attached to this application is an Excel sheet defining the C2 and C3 values as used herein for an instance of one cycle.

The example of circuit 800 of FIG. 8 is configured for audio applications. The time between samples, i.e., the interval in the “one-hot” source, is set to 30 microseconds (μs), and a single cycle is set in the capacitor values. Hence, the expected center frequency is:

$$F_{centre} = \frac{N}{T_{sample} \cdot \text{Length}}$$

In the example of FIG. 8:

$$F_{centre} = \frac{1}{30\ \text{uS} \cdot 32} = 1.04\ \text{kHz}$$

Figure 9:
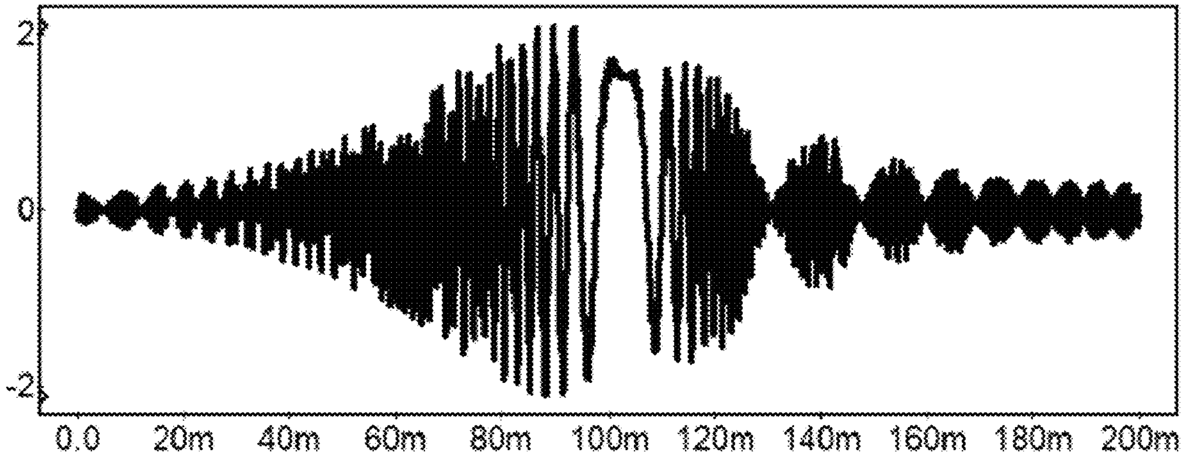
FIG. 9 is a graph of the output of the circuit of FIG. 8 according to one embodiment of the present approach.

FIG. 9 is a graph of the output of the circuit of FIG. 8 in one embodiment according to the present approach. In this instance, the input to circuit 800 of FIG. 8 is swept from about 50 Hz to about 20 kilohertz (kHz) over 200 ms. There is only one cycle of values in the capacitors. The graph of FIG. 9 shows the expected result.

Figure 10:
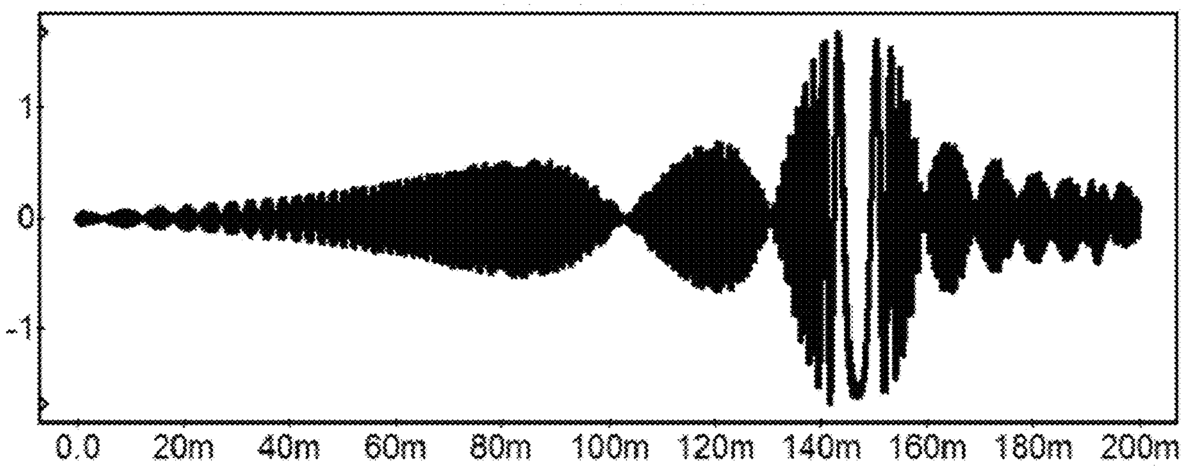
FIG. 10 is a diagram of the output of the circuit of FIG. 8 according to another embodiment of the present approach.

FIG. 10 is a diagram of the output of the circuit of FIG. 8 in another embodiment according to the present approach. In this case, the cycles count has been changed to three, so there are now three cycles of values in the capacitors as in the top line of Table 1 attached hereto. The result is the expected frequency shift, and a sin(x)/x response.

The values of the capacitors C2 and C3 across the array of 32 samples in FIGS. 9 and 10 are sinusoidal and phase coherent at the boundaries. In some cases, it is advantageous to create a "chirp" in which the signal frequency increases ("up-chirp") or decreases ("down-chirp") in time, rather than a continuous sine wave. To accomplish this in the capacitor values a window function is needed. While various window functions are known, a Kaiser window appears to be the most useful here, which may be created using the definition of the Kaiser window and Excel's Analysis Tool Pack as follows in LISP:

```
(defun kaiser-window (length &optional (a 3) (factor 1))
  (let ((i0pia (bessel–i 0 (* pi a))))
    #'(lambda (x)
      (* factor
        (if (<= 0 x (1– length))
          (/ (bessel–i 0 (* pi a (sqrt (– 1 (expt (– (/ (* 2 x) (1– length))
          1) 2))))) i0pia) 0)))))
```

The above code is the definition of the Kaiser window in LISP. This can be converted to Excel:

| | |
|---|---|
| Kalpha (B8) | 2 |
| i0pia (B9) | =BESSELI(PI( )*$B$8,0) |
| | =BESSELI(PI( )*$B$8*<br>SQRT(1–(POWER((2*A11/31)–1,2))),0)/$B$9 |

Figure 11:
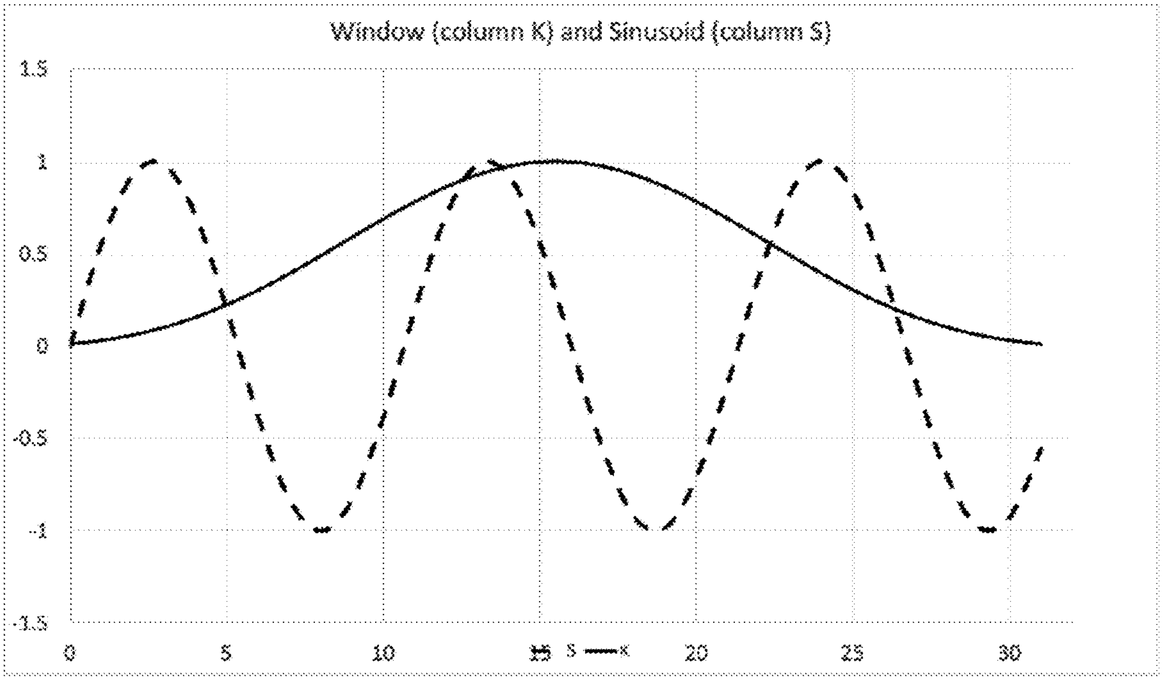
FIG. 11 is a graph of a Kaiser window function according to one embodiment of the present approach.

Table 2, also attached hereto, shows the Excel sheet that contains values of capacitors C2 and C3 that implement the Kaiser window function. FIG. 11 shows the function itself; the dashed line indicates a sine wave, column S in Table 2, and the solid line is the Kaiser window, column K in Table 2.

Figure 12:
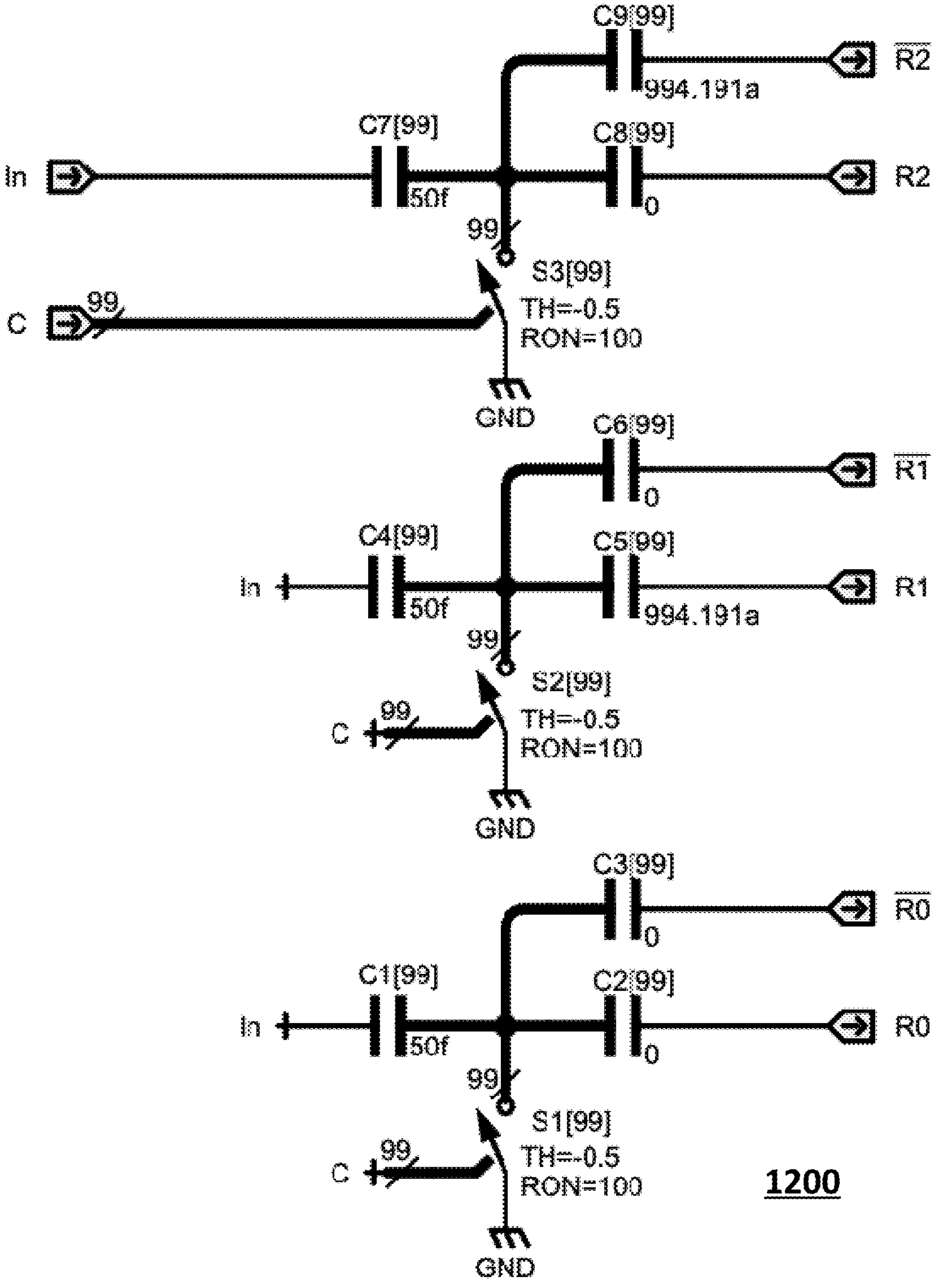
FIG. 12 is a diagram of a circuit for differential aggregation of bottom plate samplers with a three phase differential output according to one embodiment of the present approach.

FIG. 12 is a diagram of a circuit 1200 for differential aggregation of bottom plate samplers with a three phase differential output according to one embodiment of the present approach. Circuit 1200 comprises three instances of a circuit like circuit 800 of FIG. 8. The values of the capacitors are now phase shifted by 120 degrees prior to multiplying by the Kaiser window. While circuit 1200 indicates sets of 99 capacitors, all that is necessary is that the number of capacitors be divisible by three as there are three phases involved; thus, there could, for example, be sets of 33 capacitors rather than the sets of 32 capacitors shown in FIG. 8.

Figure 13:
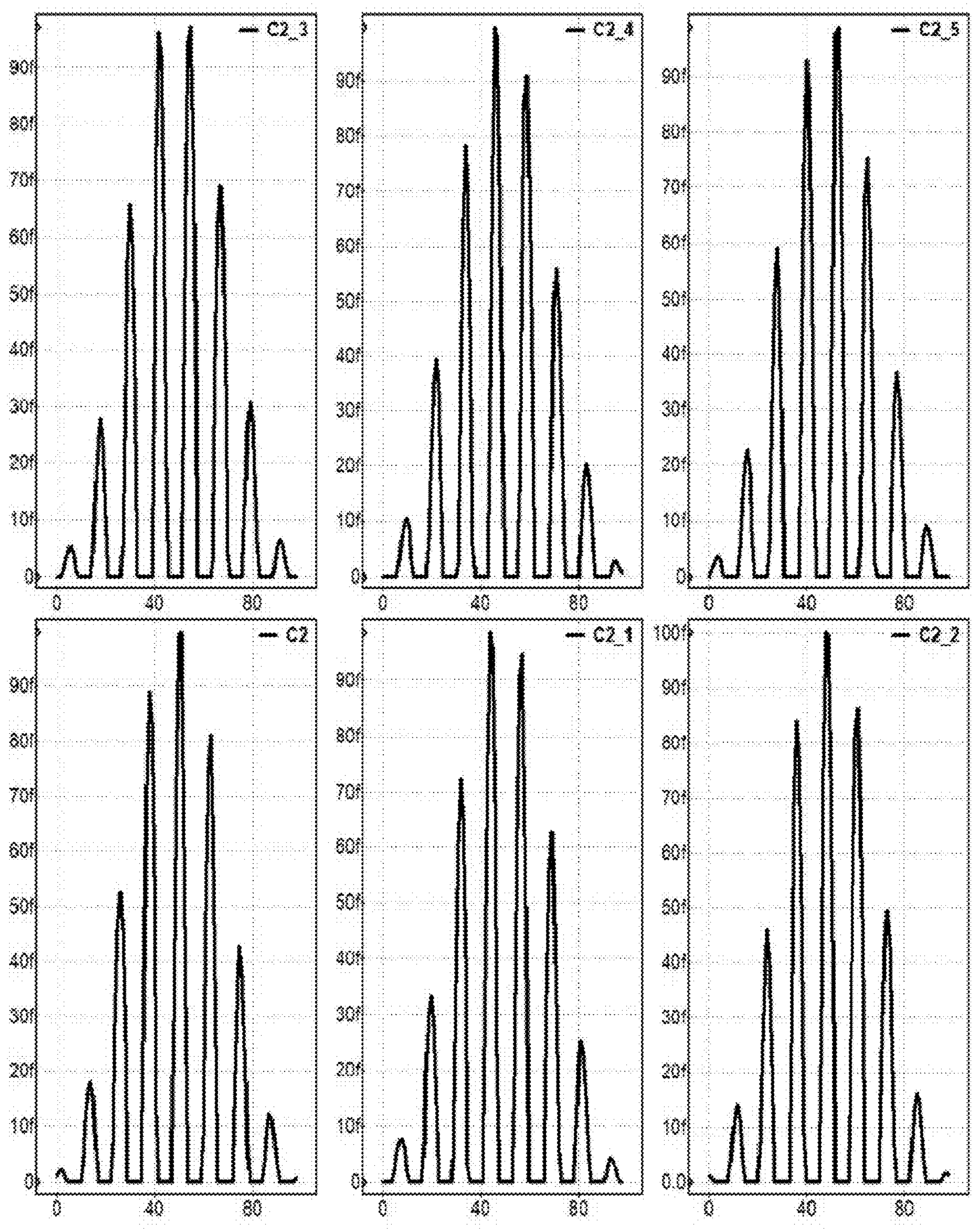
FIG. 13 shows graphs of the capacitor values for a three phase output of the circuit of FIG. 12 for eight cycles of the chirp according to one embodiment of the present approach.

FIG. 13 shows graphs of the capacitor values for a three phase output of circuit 1200 of FIG. 12 for eight cycles of the chirp.

Figure 14:
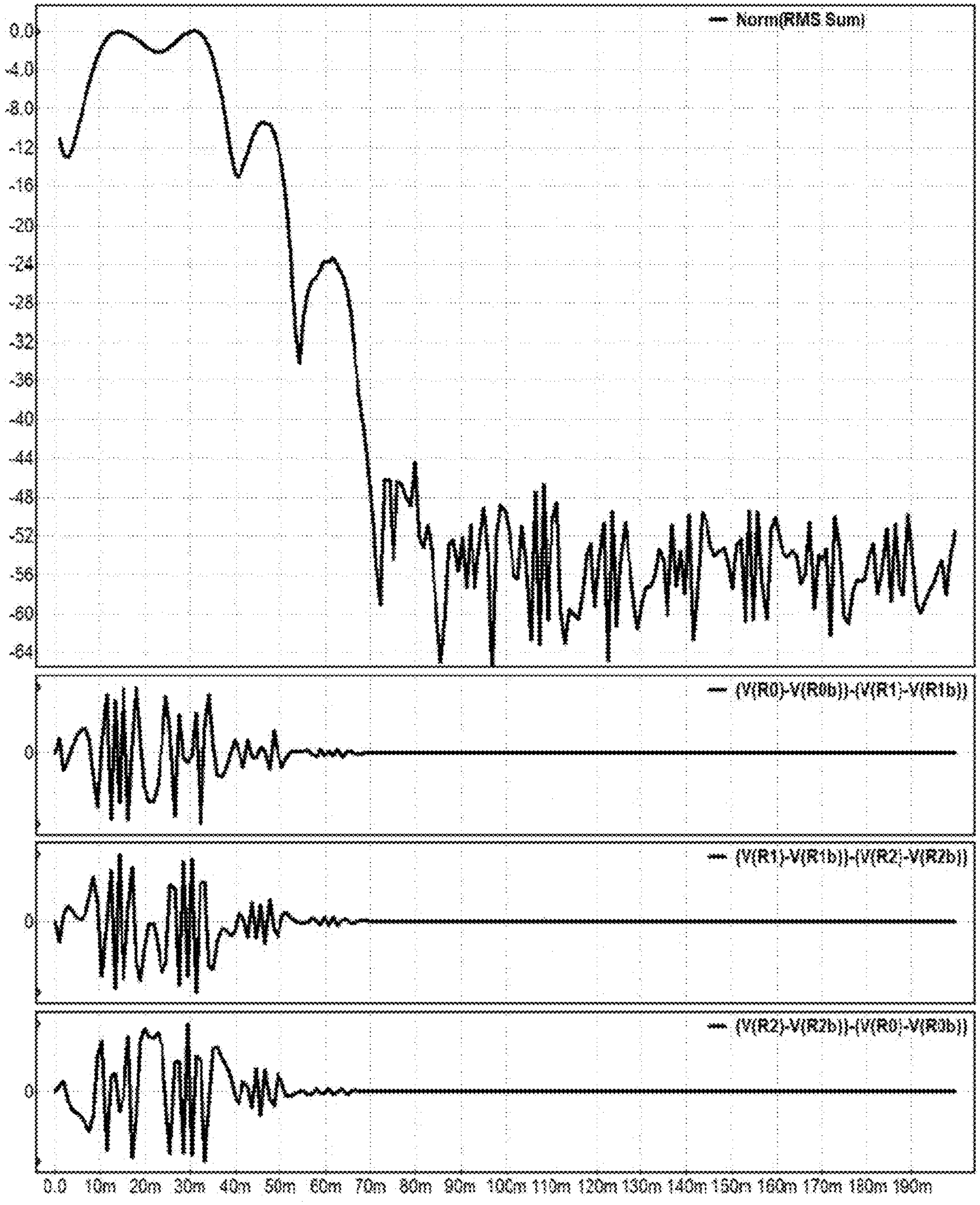
FIG. 14 shows graphs of the output of the circuit of FIG. 12 according to one embodiment of the present approach.

FIG. 14 shows graphs of the output of circuit 1200 of FIG. 12. The top graph is a graph of the RMS output of circuit 1200, while the lower graphs show the outputs of the three phases in the time domain.

Figure 15:
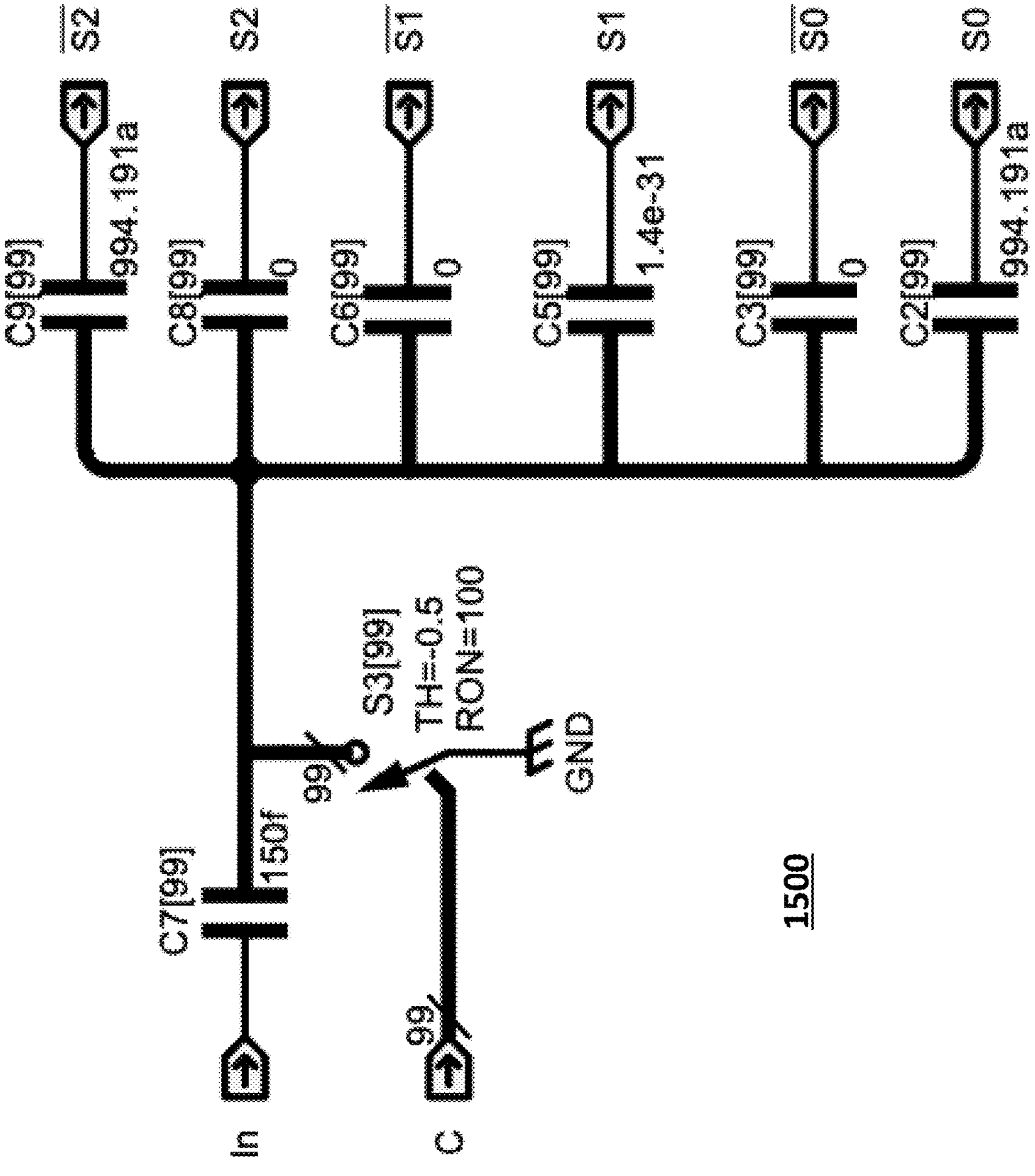
FIG. 15 is a diagram of a circuit for differential aggregation of bottom plate samplers with a three phase differential output according to another embodiment of the present approach.

FIG. 15 is a diagram of a circuit 1500 for differential aggregation of bottom plate samplers with a three phase differential output according to another embodiment of the present approach. Circuit 1500 is similar to circuit 1200 of FIG. 12 except that there is a common input connection.

Figure 16:
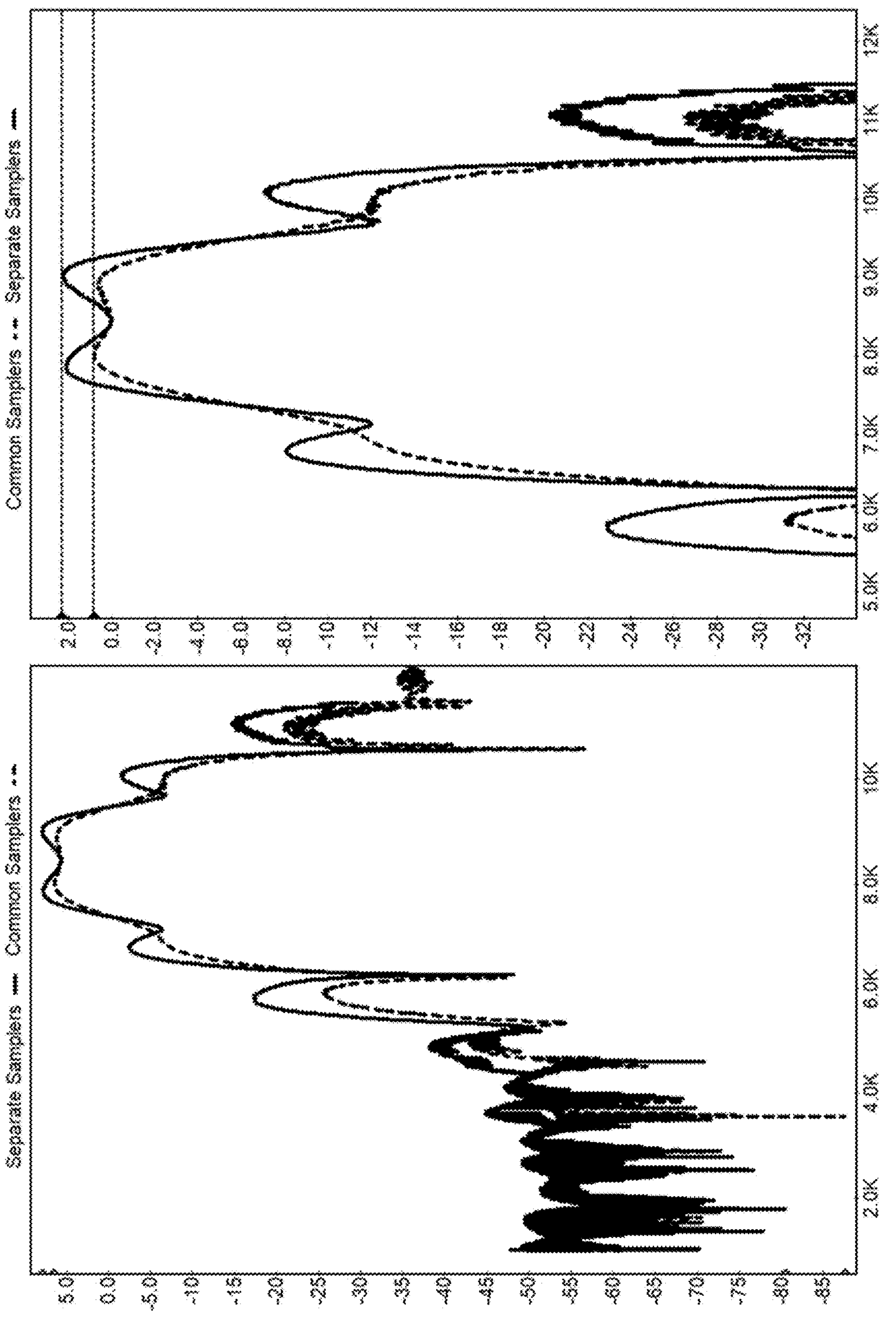
FIG. 16 is a graph comparing the response of the circuit of FIG. 12 to the circuit of FIG. 15 according to one embodiment of the present approach.

FIG. 16 is a graph comparing the response of circuit 1200 of FIG. 12 to circuit 1500 of FIG. 15. It may be seen in FIG. 16 that the common input connection of FIG. 15 provides a better response than the separate connection of FIG. 12.

Figure 17:
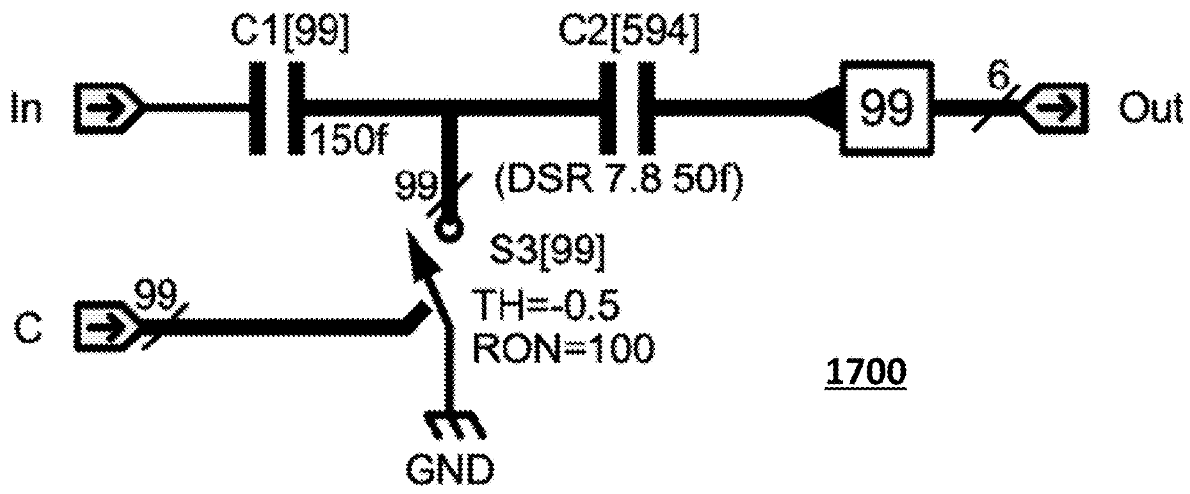
FIG. 17 is a simplified diagram of the circuit of FIG. 15 using a functional description of the capacitor values and the connections according to one embodiment of the present approach.

FIG. 17 is a simplified diagram of the circuit of FIG. 15 using a functional description of the capacitor values and the connections. The box labeled "99" causes the connections on the 594 wires in the bus on the left to be connected 99 at a time to the six-bit bus on the right. For example, elements of the bus connecting the capacitor C[0-593] connect to elements of the bus "Out[0-5]" as follows:

| Bus index on left of "99" box | Connects to | Bus index in "Res" output |
|---|---|---|
| C[0] | | Res[0] |
| C[1] | | Res[0] |
| Etc. | | Res[0] |
| C[98] | | Res[0] |
| C[99] | | Res[1] |
| C[100] | | Res[1] |
| etc. | | Res[1] |
| C[197] | | Res[1] |
| C[198] | | Res[2] |
| etc. | | |
| C[593] | | Res[5] |

The capacitor C2 in circuit 1700 indicates (DSR 7.8 50f) as its value. This is a call to a LISP function that returns a value that differs for each instance of the capacitor. (The name DSR is from Direct Sampling Resolver). As each of the 594 capacitors are instantiated DSR is called with the index. For example, the first resistor calls for DSR with index 0, while the last resistor calls for DSR with index 593. The function DSR creates a chirp as described in Table 2 in the Excel sheet. For reference the DSR function and supporting functions is given in Appendix A.

The output signals are not directly the differential outputs, but rather are the difference of differences. This corresponds to the edges of the equilateral triangle created by the phase shifted three phase output. By using the difference of differences, the gain is increased, and the rejection is improved.

Figure 18:
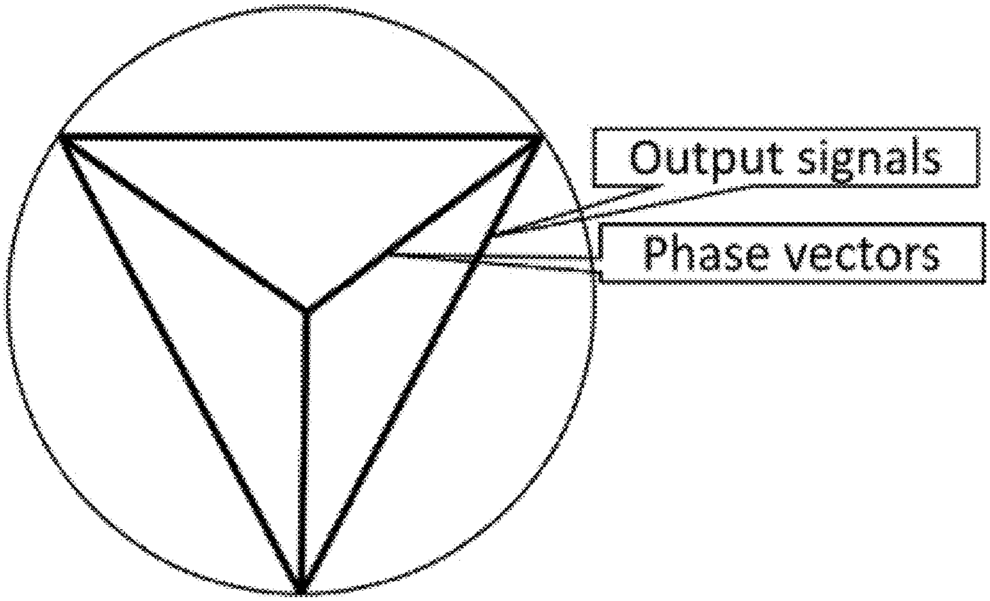
FIG. 18 illustrates the difference of differences that are the outputs of the circuit of FIG. 17 according to one embodiment of the present approach.

FIG. 18 illustrates the difference of differences that are the outputs of circuit 1700 of FIG. 17. The phase vectors themselves are the difference of the outputs, and the signal outputs are the difference of these differences. This results in gain, in spite of the absence of active devices. The gain at the peak is given by:

$$4 \cdot \sin\left(\frac{\pi}{3}\right) = 3.4641$$

Figure 19:
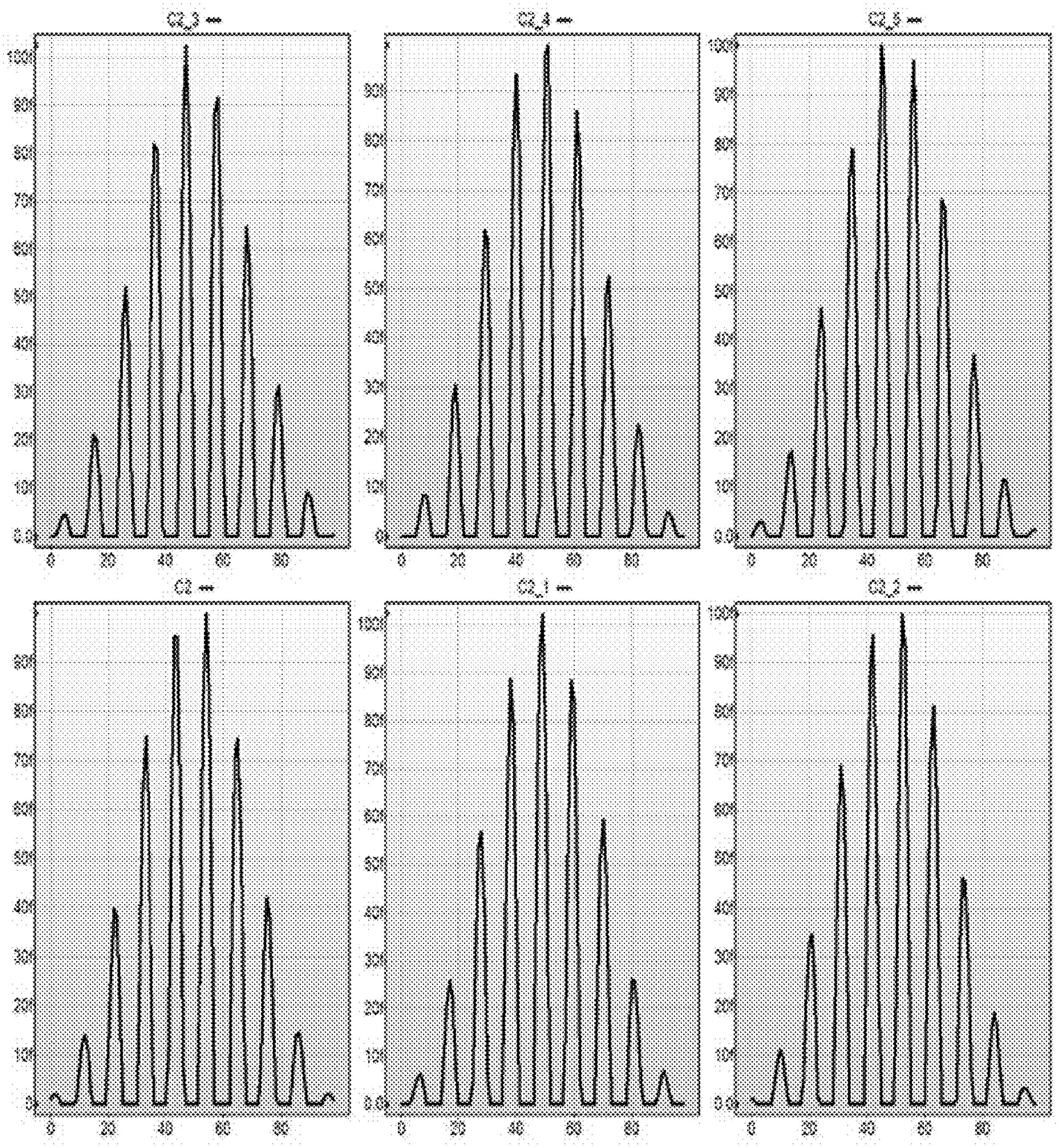
FIG. 19 shows graphs of capacitor values when there are 9.3 cycles in the chirp according to one embodiment of the present approach.
Figure 20:
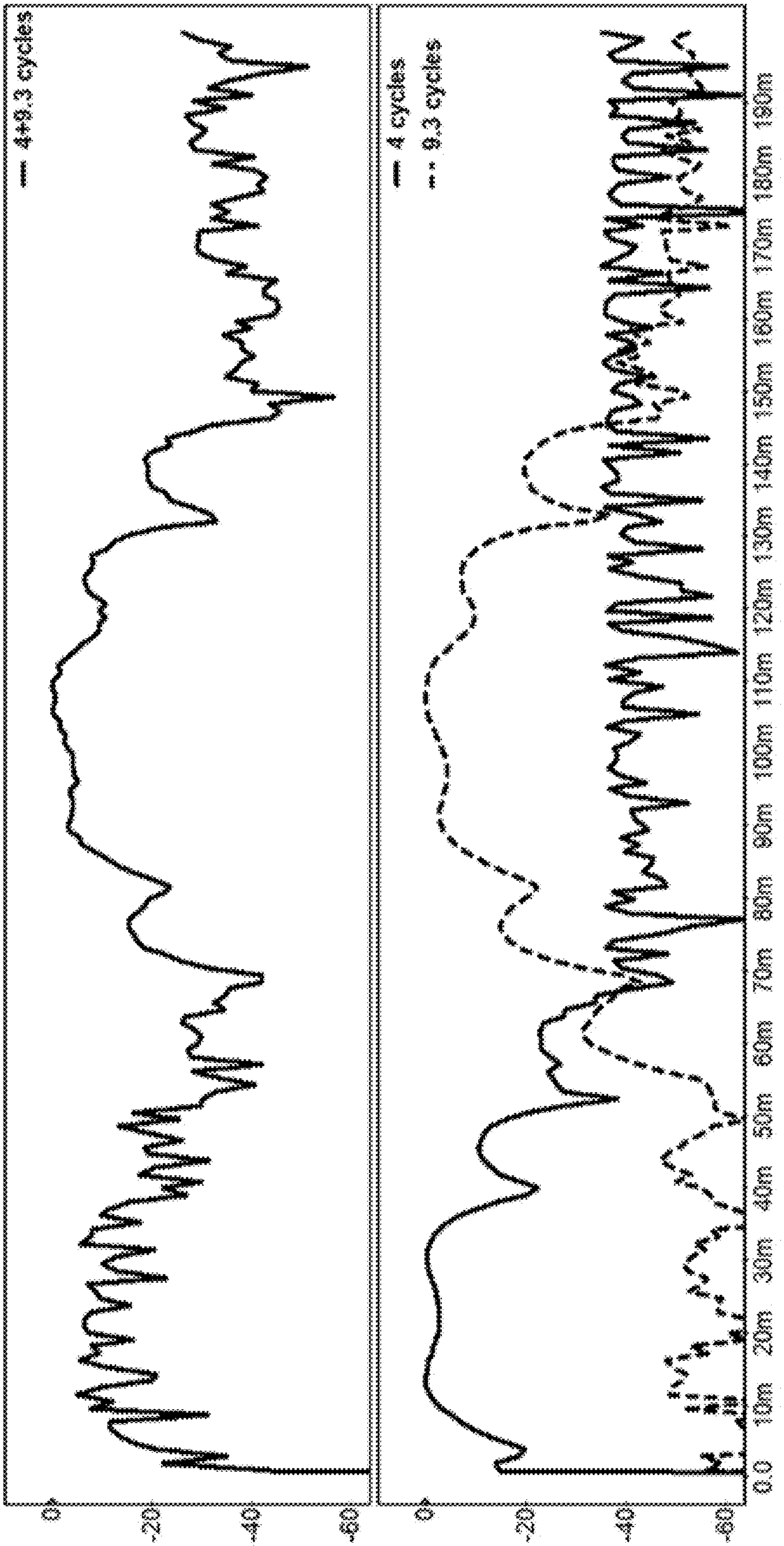
FIGS. 20 and 21 show graphs of the output of the circuit of FIG. 17 for different numbers of cycles for the chirp according to one embodiment of the present approach.

Tests have shown that a system of this type is linear and that arbitrary frequencies may be used. FIG. 19 shows graphs of capacitor values when there are 9.3 cycles in the chirp. FIG. 20 is a result of three separate tests. In the lower graph of FIG. 20, a solid line indicates a test with 4 cycles in the chirp, while the dashed line indicates a test with 9.3 cycles in the same chirp. The upper graph shows the actual output from both chirps; it is approximately the sum of the response of the chirps at 4 cycles and 9.3 cycles.

Figure 21:
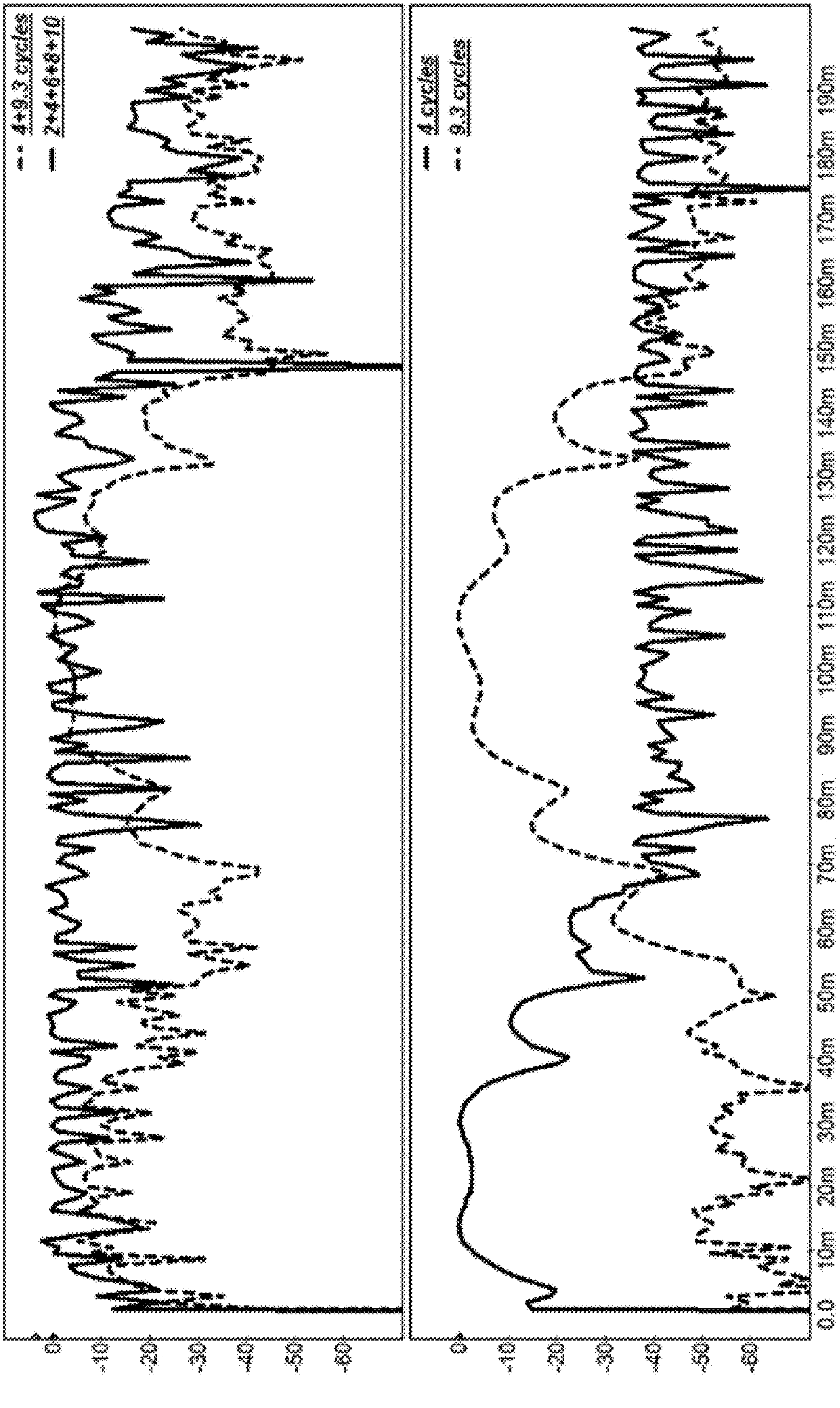

Empirical observations indicate that the flatness of a summation was improved in instances adding 1.6 to 2.2 cycles over an interval. FIG. 21 shows the graphs of FIG. 19 compared to a summation of 2, 4, 6, 8 and 10 cycles on a log x scale. Using the set of cycles spaced by 2 will be seen to be flatter than the sum of the 4 cycle and 9.3 cycle graphs.

Figure 22:
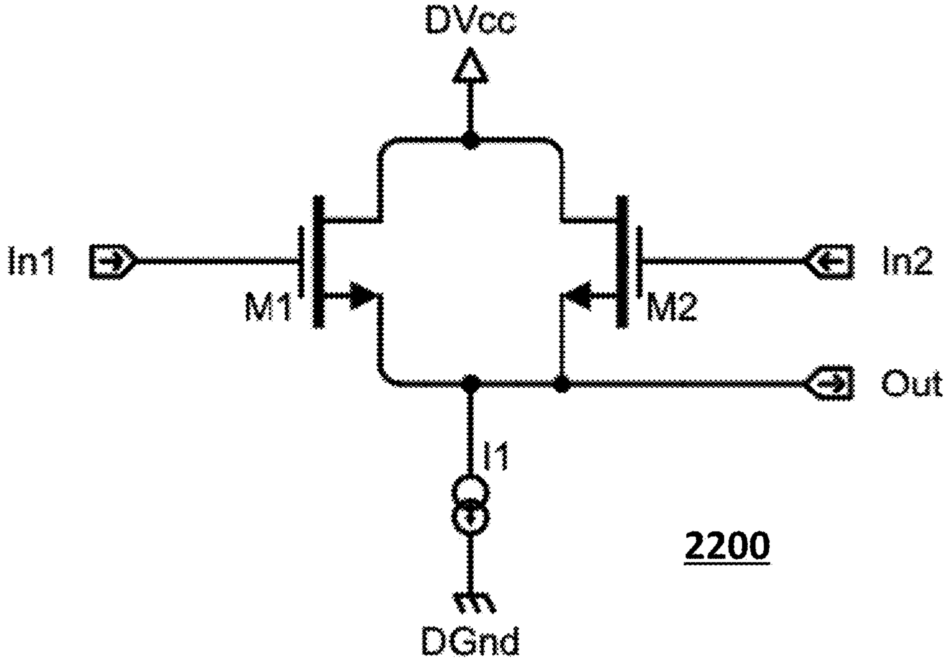
Fig. 22 (Prior art)
FIG. 22 is a diagram of a circuit that has an output voltage that is the maximum of the input voltages as is known in the prior art according to one embodiment of the present approach.

A circuit to find the amplitude present in the multiphase output may be made using a complex interconnection of small devices. FIG. 22 is a diagram of a circuit 2200 that has an output voltage that is the maximum of the input voltages In1 and In2 due to the well-known characteristics of the NMOS devices as is known in the prior art.

Figure 23:
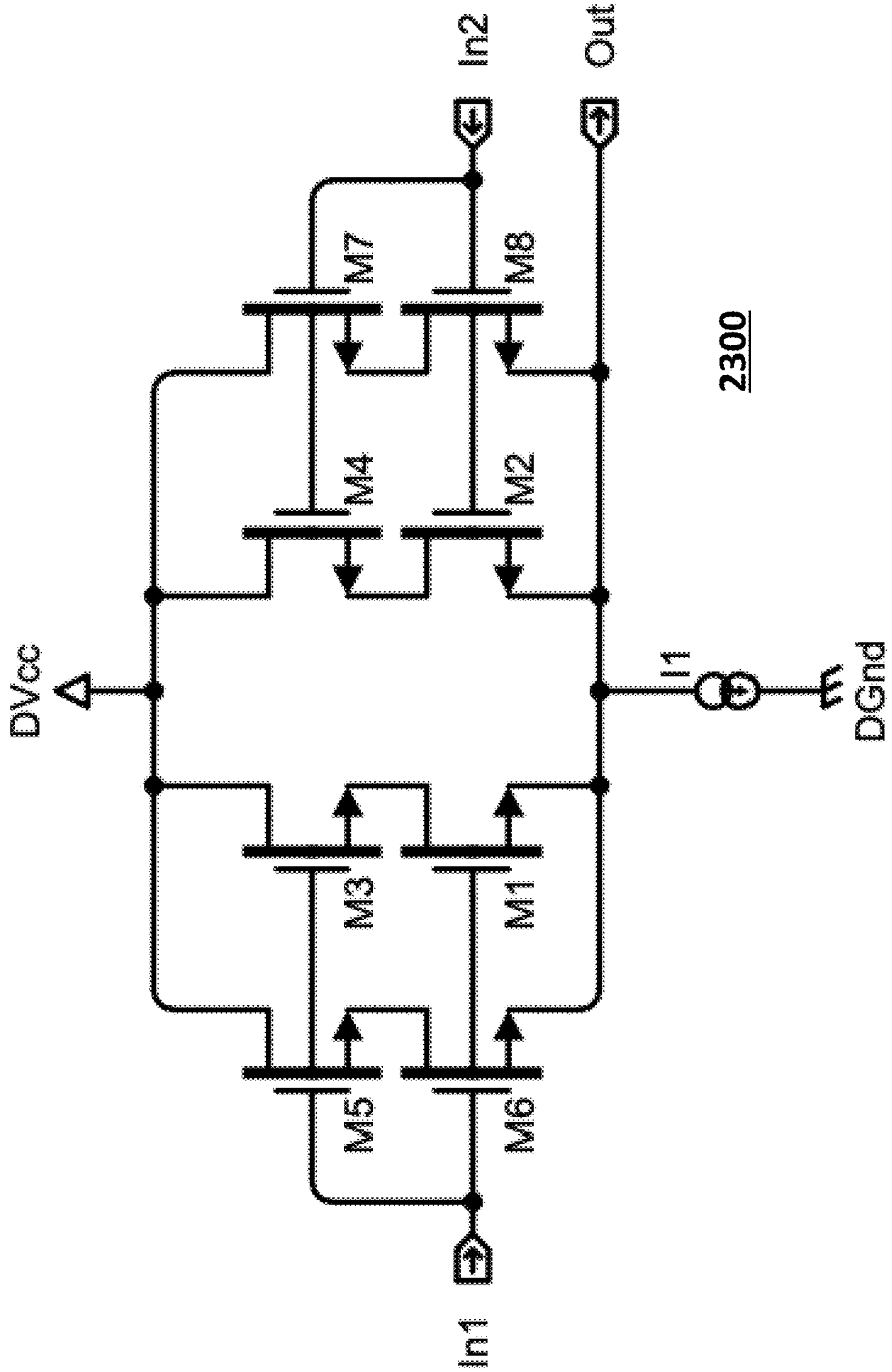
Fig. 23 (Prior art)
FIG. 23 is a diagram of another circuit that has an output voltage that is the maximum of the input voltages as is known in the prior art.

FIG. 23 is a diagram of a circuit 2300 that also has an output voltage that is the maximum of the input voltages In and In2 using two NMOS transistor pairs in series and then in parallel as is known in the prior art. To a first order, the transconductance Gm is halved by the series connection, but then doubled by the parallel connection. Thus, circuit 2300 retains significant similarity to circuit 2200.

Figure 24:
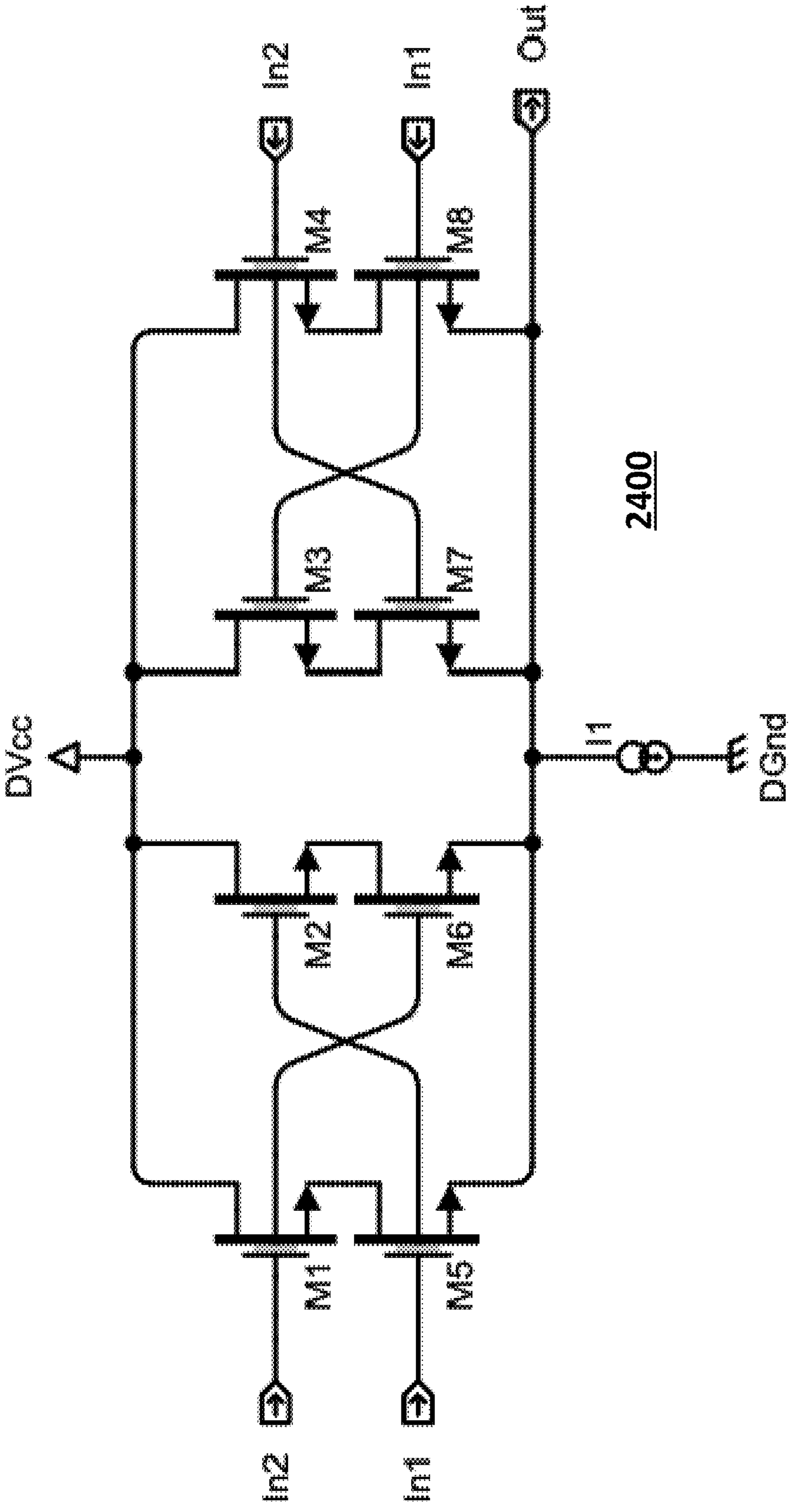
FIG. 24 is a diagram of a circuit in which a permutation is made to the inputs of the transistors of the circuit of FIG. 23 according to one embodiment of the present approach.

FIG. 24 is a diagram of a circuit 2400 in which a permutation is made to the inputs of the transistors of circuit 2300. The output of circuit 2400 will no longer track the maximum of the input voltages In1 and In2 as might be expected, but rather will track the minimum of the inputs.

Figure 24A:
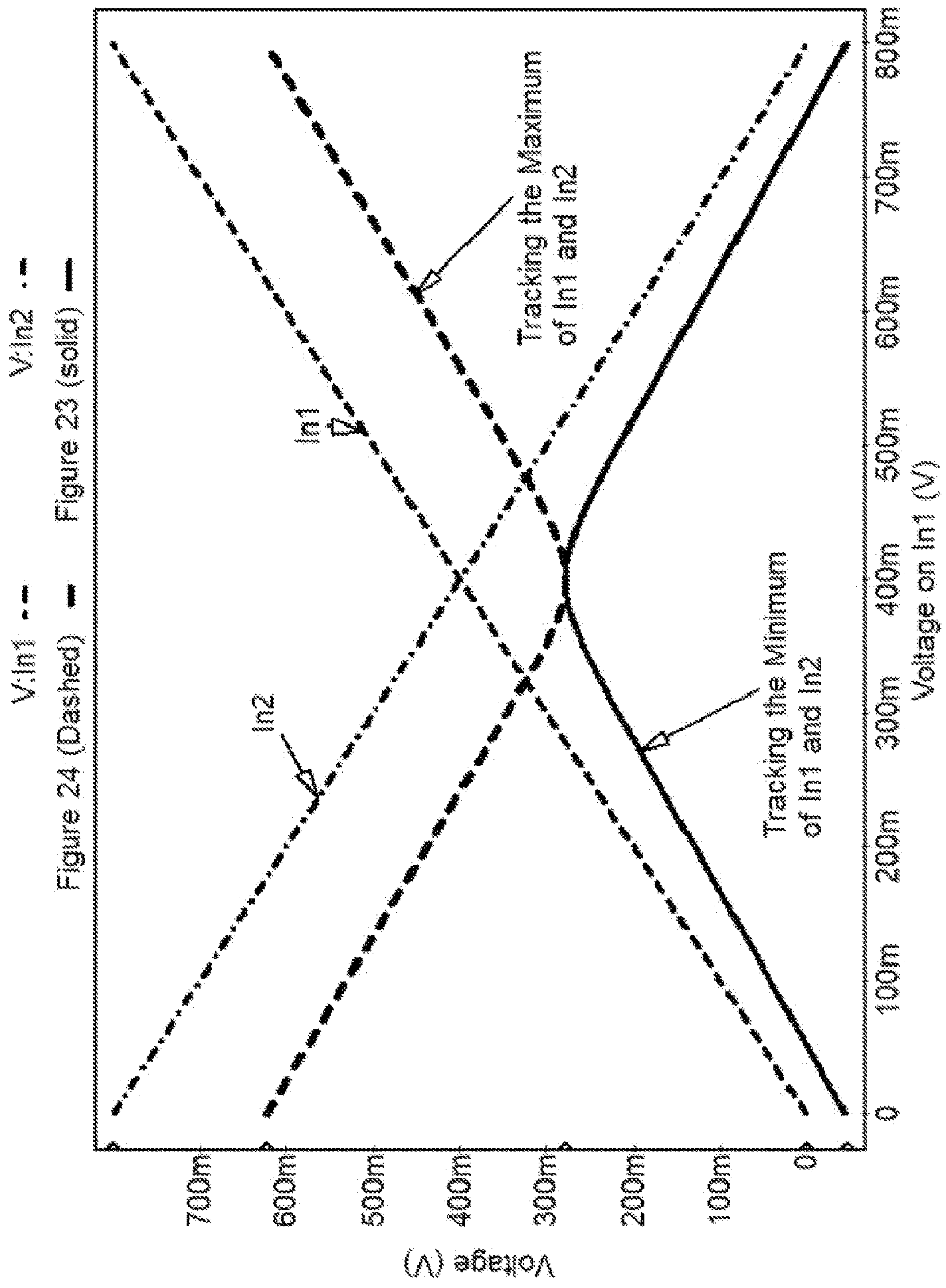
FIG. 24A is a graph comparing the outputs of the circuit of FIG. 23 and the circuit of FIG. 24.

FIG. 24A is a graph comparing the outputs of circuit 2300 of FIG. 23 and circuit 2400 of FIG. 24. The upper dashed lines show the input voltages In1 and In2. The heavy dashed line indicates the output of circuit 2300, which as above tracks the maximum of In1 and In2. The solid line indicates the output of circuit 2400, which tracks the minimum of In1 and In2.

Figure 25:
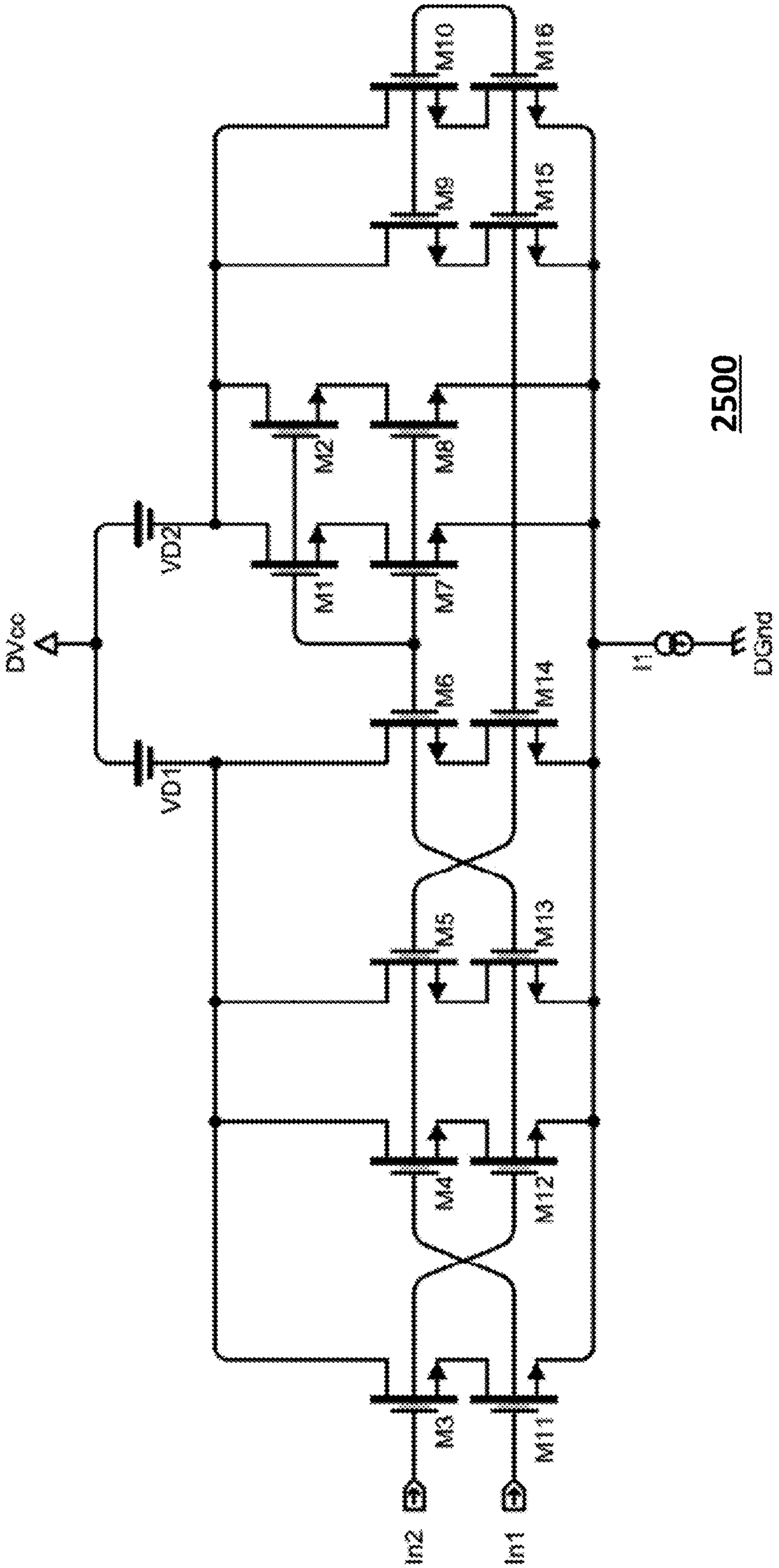
FIG. 25 is a diagram of a circuit in which the circuit of FIG. 23 and the circuit of FIG. 24 are joined to make a long-tailed pair according to one embodiment of the present approach.
Figure 26:
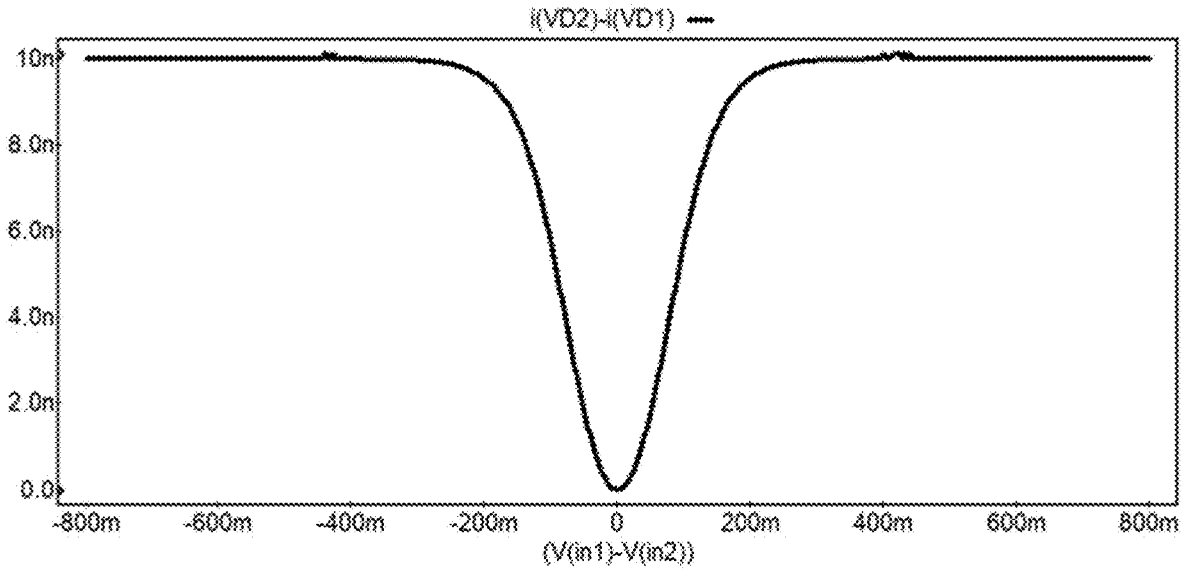
FIG. 26 shows the output current difference of the circuit of FIG. 25 as the difference between the input voltages is varied according to one embodiment of the present approach.

FIG. 25 is a diagram of a circuit 2500 in which circuit 2300 of FIG. 23 and circuit 2400 of FIG. 24 are joined to make a long-tailed pair. FIG. 26 shows the output current difference as the difference between In1 and In2 is varied; it may be noted that the circuit responds to the absolute value of the difference.

Figure 27:
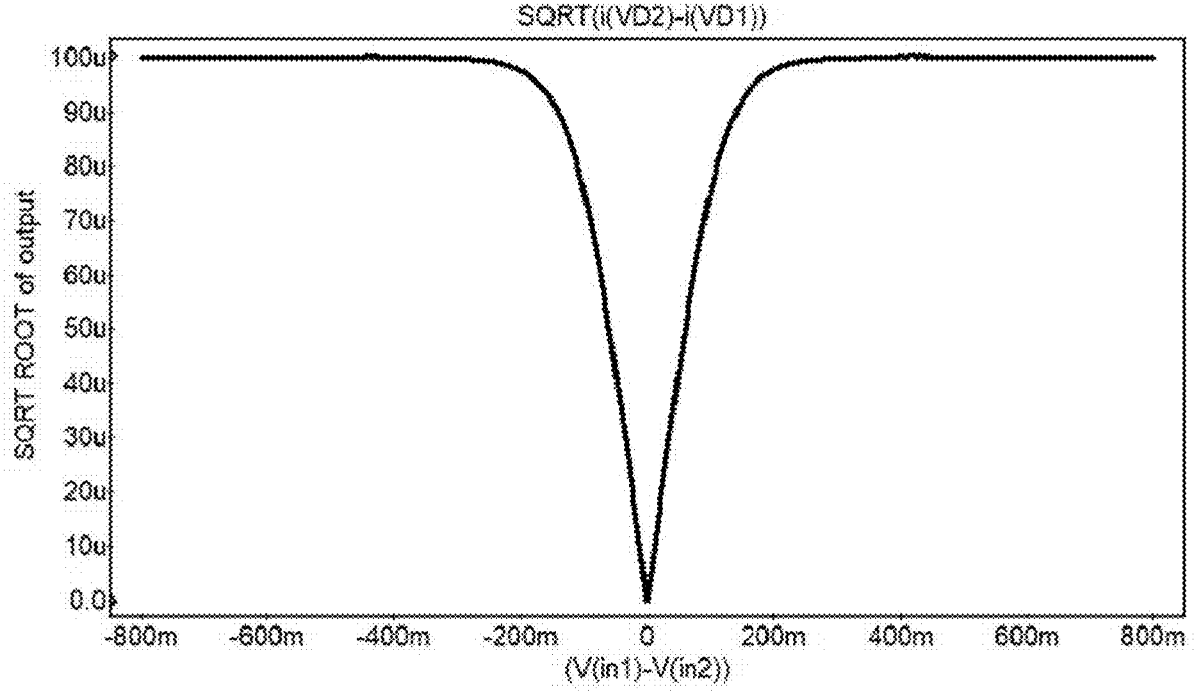
FIG. 27 is a graph plotting the square root of the graph of FIG. 26 according to one embodiment of the present approach.

For advanced CMOS devices running at the typical currents of the present approach, which are about 10 nA, it is noted that the performance as the difference passes through zero is roughly parabolic due to the sub-threshold characteristics of the FETs. FIG. 27 shows a linear region because FIG. 27 plots the square root of FIG. 26.

Such a circuit that detects the absolute value of an input signal is not limited to two inputs. The systematic extension of the circuits described above is possible. For example, FIG. 28 extends circuit 2300 of FIG. 23 to four inputs and will respond to the maximum value of those inputs.

Figure 28:
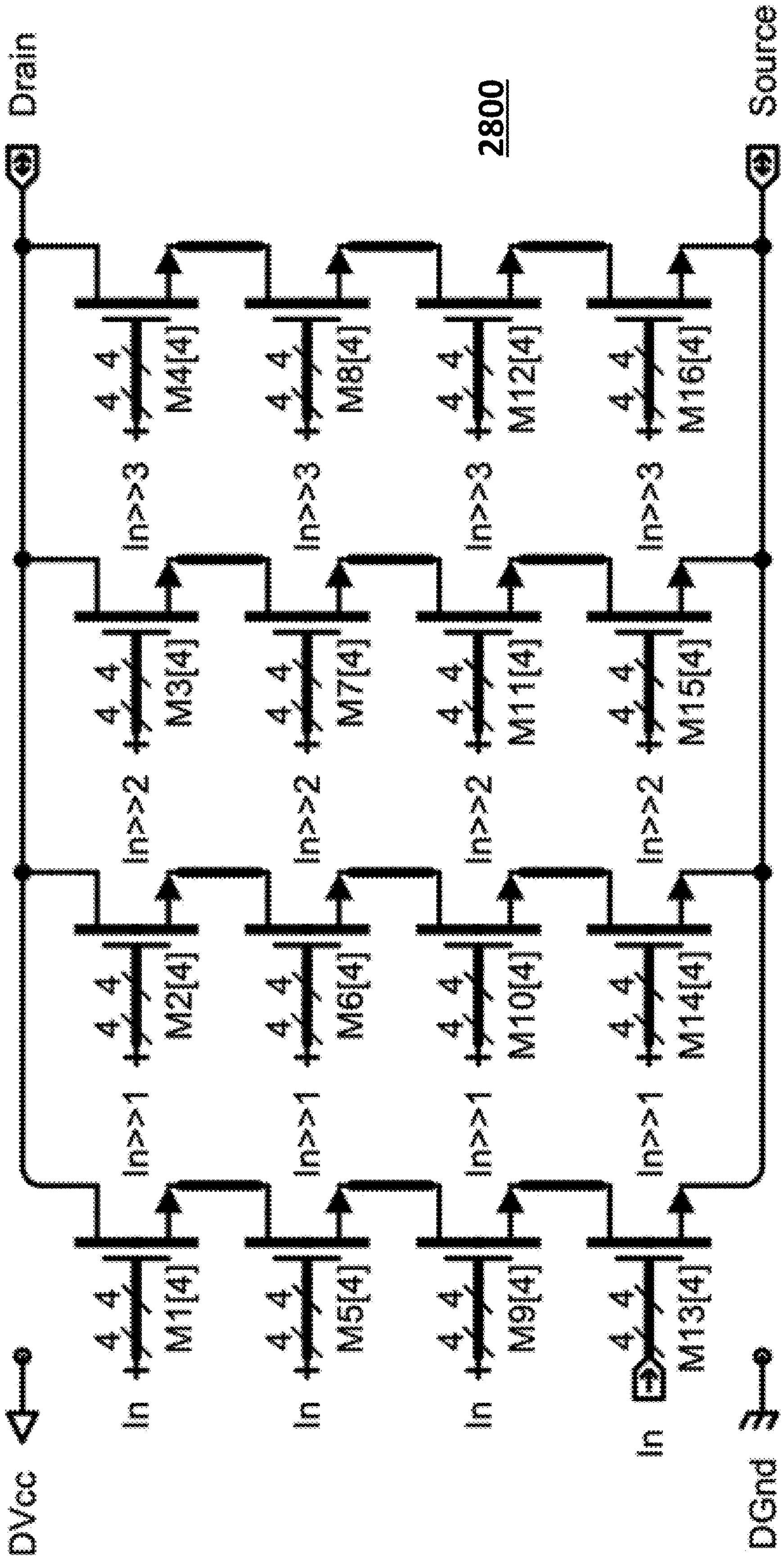
FIG. 28 is a diagram of a circuit extending the circuit of FIG. 23 to four inputs according to one embodiment of the present approach.
Figure 29:
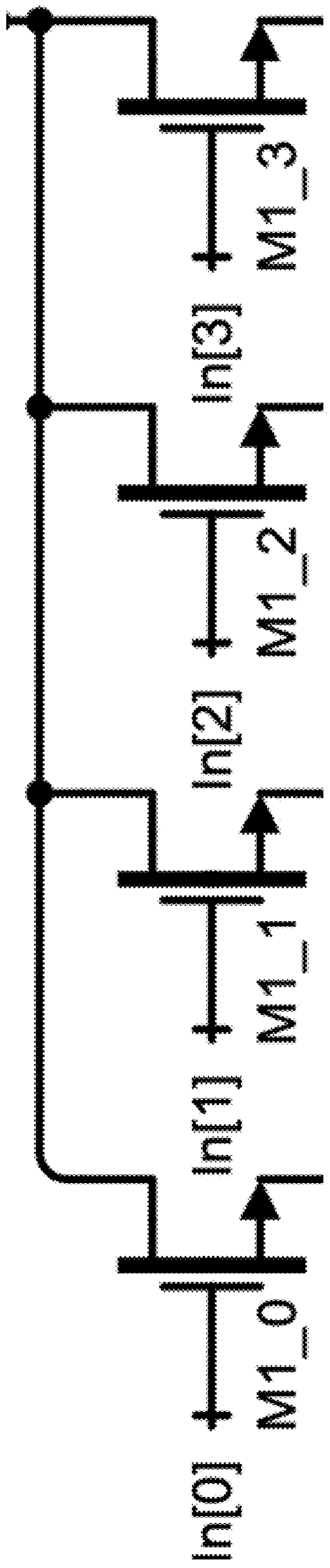
FIGS. 29 and 30 are expanded illustrations of portions of the circuit of FIG. 28 according to one embodiment of the present approach.

In FIG. 28, busses and indications of connection methods are used. For example, in FIG. 28 transistor M1 is labeled as "M1[4]," indicating that there are four transistors in that position. The four input bus brings in the In input, which is itself four elements wide, so that each of the M1 transistors take the wires in sequence from the input bus. This is illustrated in FIG. 29, which expands the illustration of M1[4].

Figure 30:
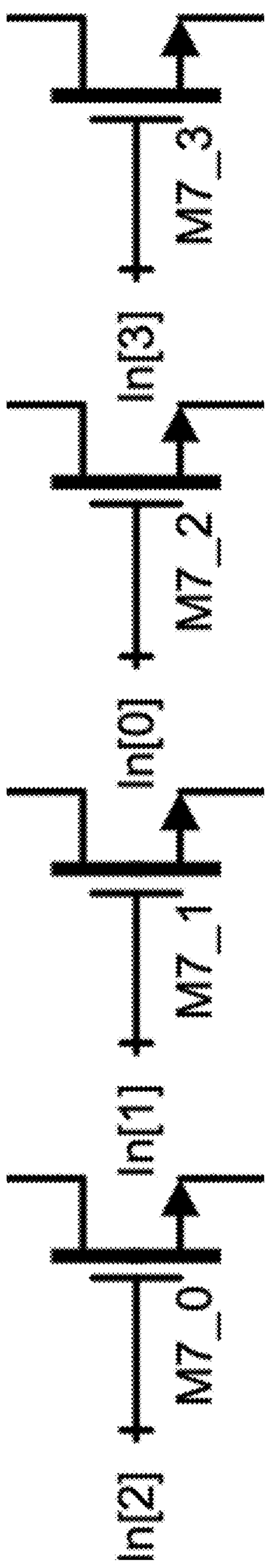

Wires including the rotate right operator such as In>>2 connect after a rotation of the number (here 2). Thus, for example, transistor M7 in circuit 2800 may be expanded as shown in FIG. 30.

As above, FIG. 28 shows how circuit 2300 of FIG. 23 may be developed to track the maximum value of any arbitrary number of inputs. A circuit to track the minimum value of any number of inputs may similarly be developed from circuit 2400 of FIG. 24.

Figure 31:
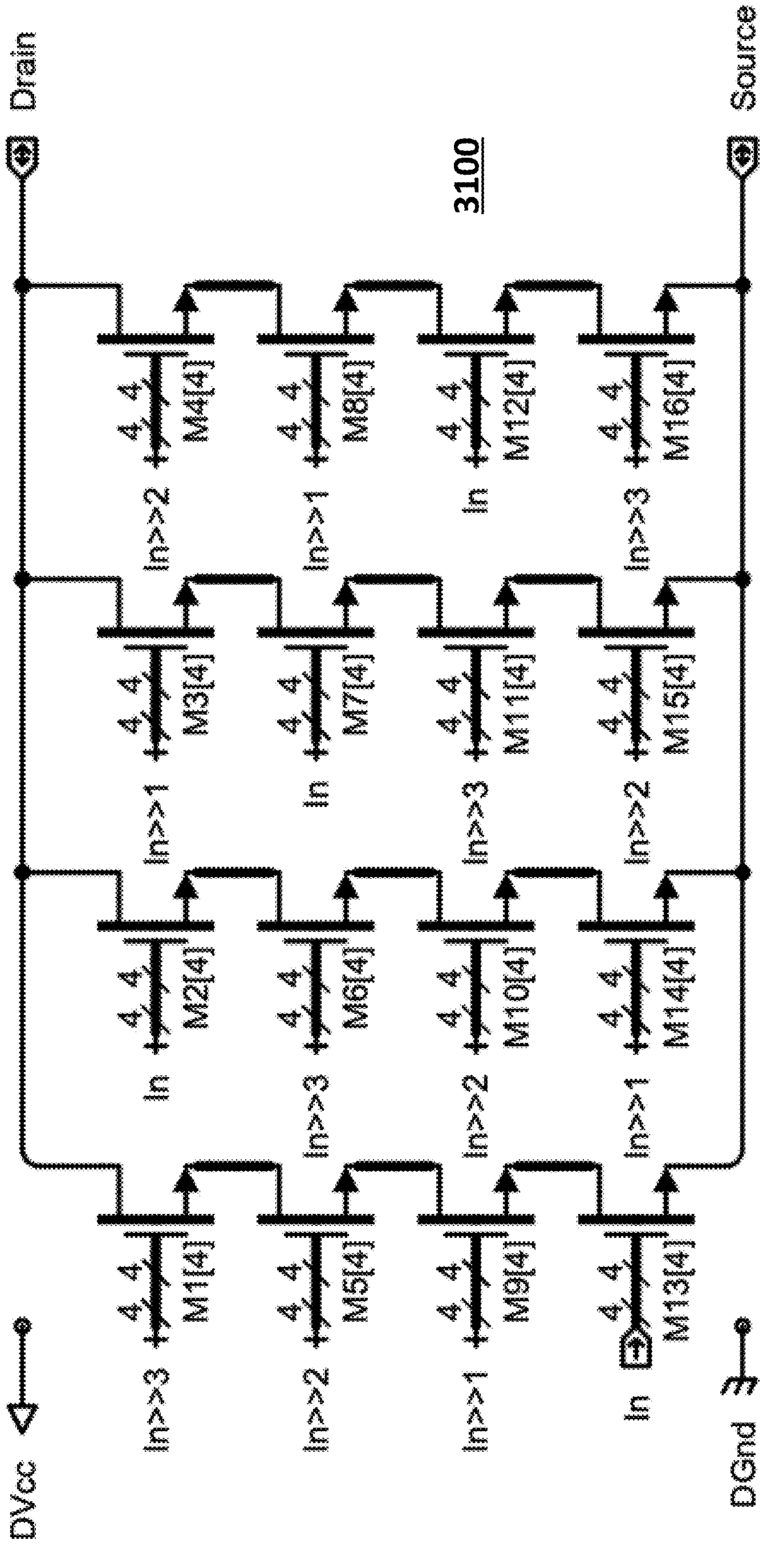
FIG. 31 is a diagram of a circuit extending the circuit of FIG. 24 to four inputs according to one embodiment of the present approach.

FIG. 31 is a diagram of a circuit 3100 that extends circuit 2400 of FIG. 24 to four inputs and will respond to the minimum value of those inputs.

The difference between circuit 3100 of FIG. 31, (multiple inputs, responding to the minimum value) and circuit 2800 of FIG. 28 (multiple inputs, responding to the maximum value) is that in circuit 3100 the rotation operator advances both horizontally and vertically. In circuit 2800 the rotation operator advances only horizontally.

Each min/max device contains $N^3$ devices, so the combination uses $2N^3$ devices. It is significant that the minimum and maximum circuits 3100 and 2800 are indistinguishable if the inputs are indistinguishable. This ensures that there is no systematic offset, and noise, including 1/f noise, is averaged.

Figure 32:
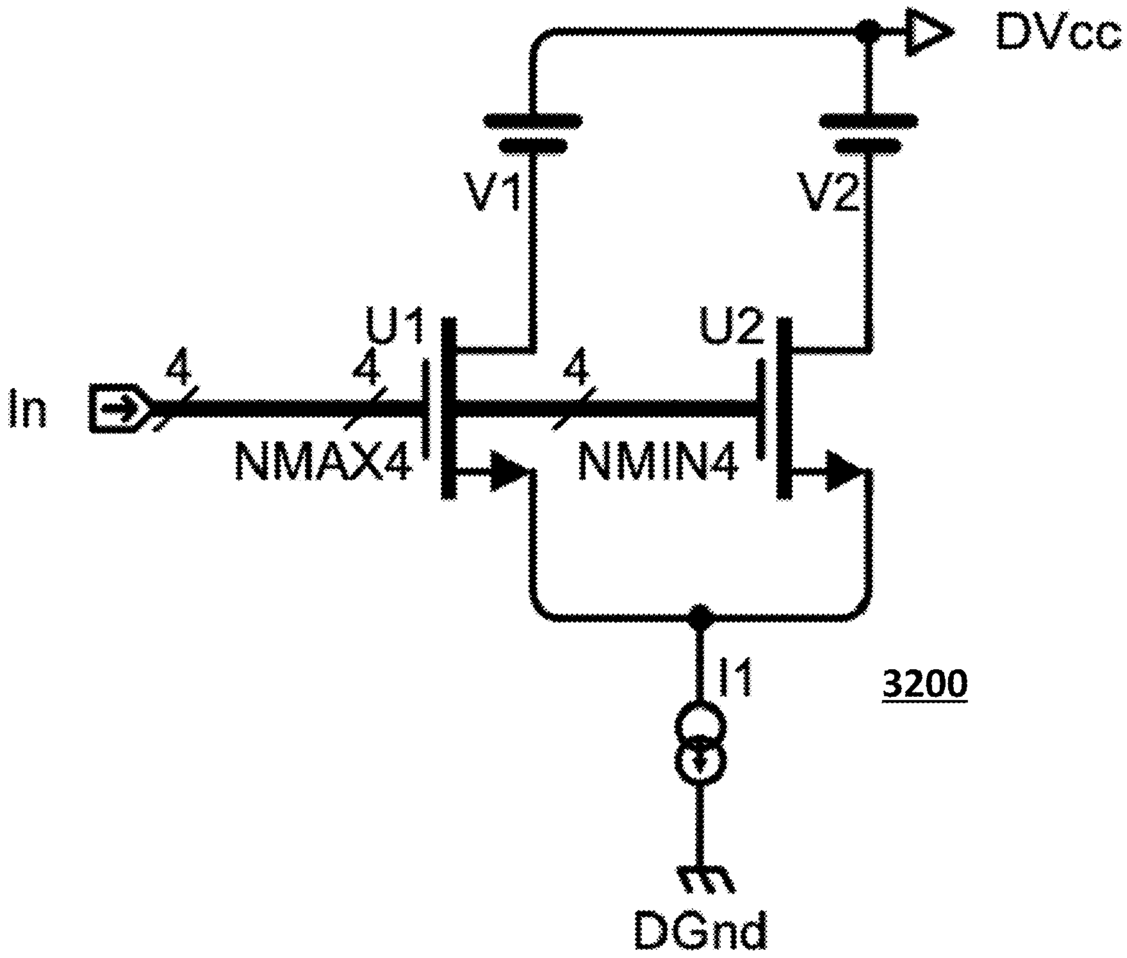
FIG. 32 is a diagram of a circuit illustrating how the circuits of FIGS. 28 and 31 may be represented as icons according to one embodiment of the present approach.

FIG. 32 is a diagram of a circuit 3200 illustrating how circuits 2800 and 3100 of FIGS. 28 and 31 may be represented as icons. Circuit 2800 is shown as element U1, and circuit 3100 is shown as element U2. The functionality of circuit 3200 is that of circuit 2500 of FIG. 25 above but extended to four inputs.

Figure 33:
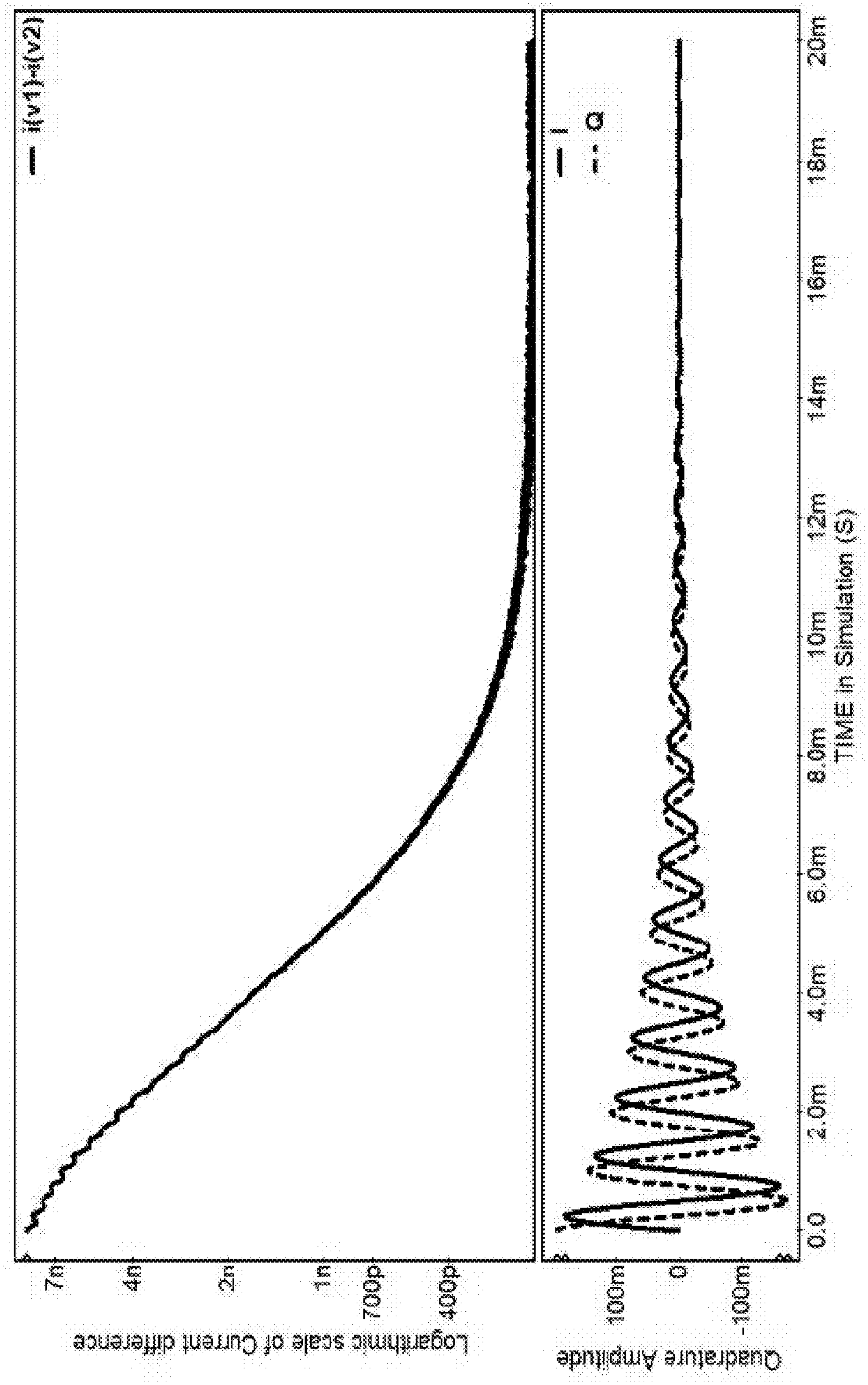
FIG. 33 is a graph of the response of the circuit of FIG. 32 according to one embodiment of the present approach.

FIG. 33 is a graph of the response of circuit 3200 of FIG. 32. The response is to find and track the amplitude of a quadrature signal; the quadrature signal applied experiences a logarithmic delay, and thus the derived output signal (the current difference in the drains) should be linear on a logarithmic scale. From about time zero, where the quadrature amplitude is about 400 millivolts (mV) peak-to-peak, to about 8 ms time, where the quadrature amplitude is about 33 mV, which is down 22 decibels (dB), the circuit works well. Below about 7.4 mV, or down 35 dB, the quadrature signal is not detected.

In one embodiment of the design of the VAD three differential phases are used, which uses 6 inputs in total. This is done to remove the ripple that is evident on the output in the quadrature case for high signals. The total current consumption in these examples is 10 nA.

In the examples above, the action of the long-tailed-pair configured with minimum and maximum connected FET groups has been demonstrated with a constant, albeit very small, current of about 10 nA. It is possible to consume even less power.

Figure 34:
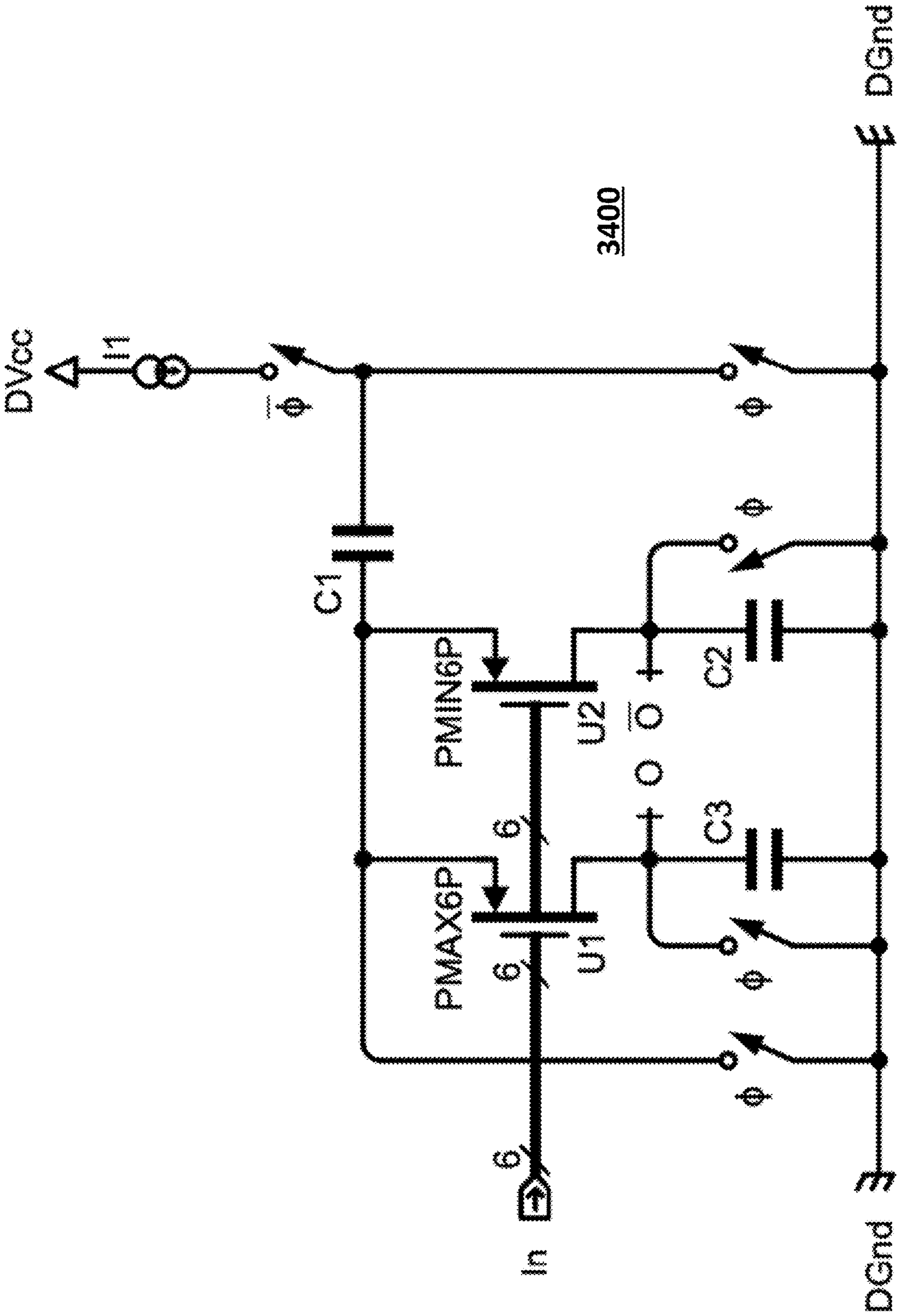
FIG. 34 is a diagram of a charge based absolute value circuit that consumes less power than the circuit of FIG. 32 according to one embodiment of the present approach.

FIG. 34 is a diagram of a charge based absolute value circuit 3400 that consumes less power than circuit 3200 of FIG. 32. In circuit 3400 the PMAX6 and the PMIN6 are PMOS devices constructed as above.

During a first phase, the switches marked phi (ϕ) are closed and the switch marked phi-inverted (ϕ with a line above it) is open. In a second phase, the phi switches open and the phi-inverted switch closes. Thus, the charge on capacitor C1 is dumped into the PMOS MIN/MAX circuit at a rate controlled by the current I1, which is typically 10 nA. If, for example, the capacitor C1 is 20 femtofarads (fF), the operation rate is 1 kHz and the voltage excursion is about 0.5 volts, (which is the voltage on source DVcc, typically 0.8 v, minus the typical PMOS threshold of about 300 mV), the current consumption $I_{aa}$ is given by $$I_{dd} = V \cdot C \cdot f = 0.5 \cdot 20fF \cdot 1k = 10 \text{ pA}$$

which is significantly lower than the 10 nA current consumption of circuit 3300.

Figure 35:
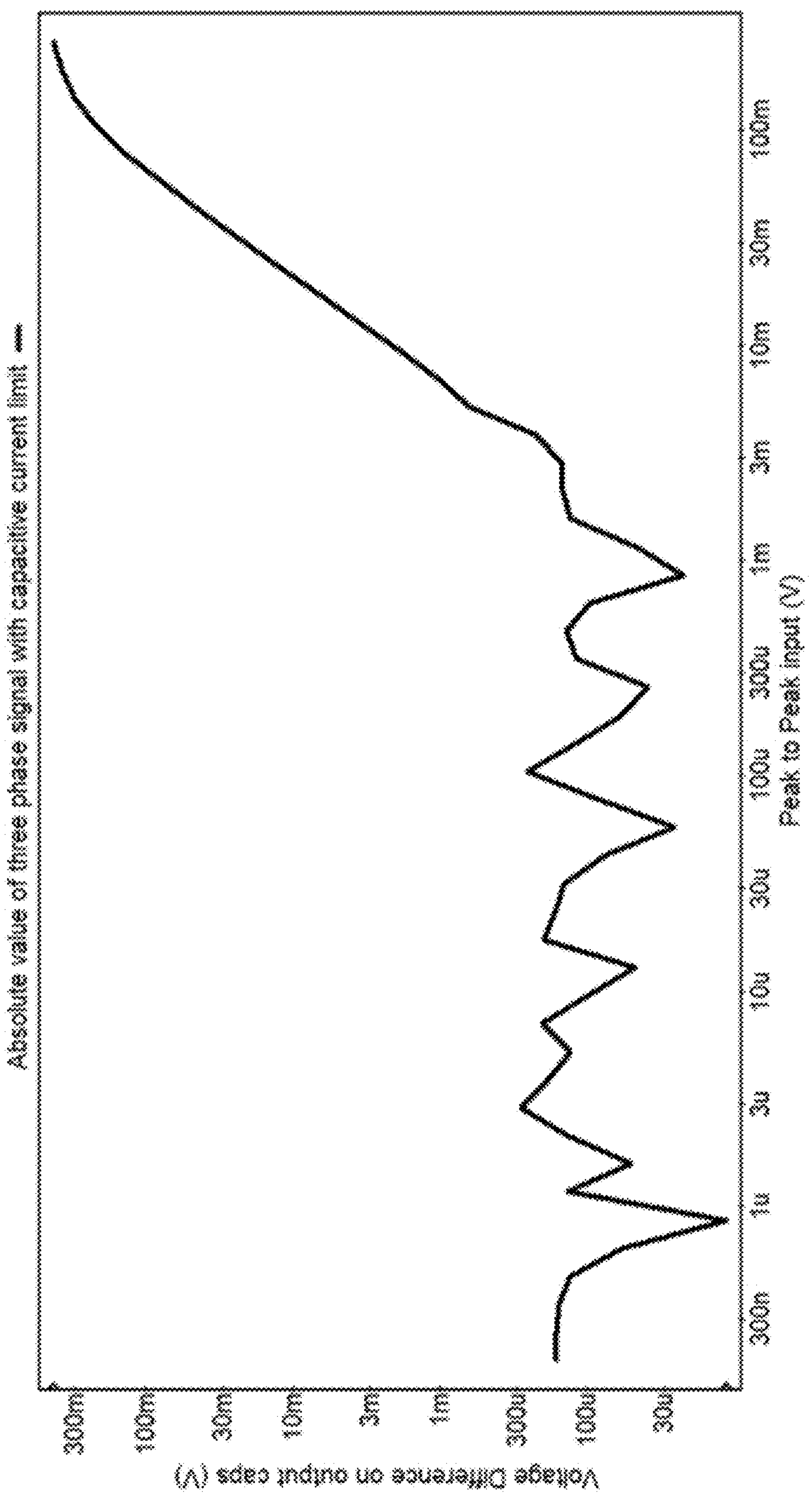
FIG. 35 is a graph of the output of the circuit of FIG. 34 according to one embodiment of the present approach.

FIG. 35 is a graph of the output of circuit 3400 of FIG. 34, the value of V(Ob)−V(O) with the phi clock running at 2 kHz. The principle of operation is the same, during the second phase capacitor C1 is conducting the current into the common source of PMAX and PMIN; that charge is partitioned into capacitors C2 or C3 in proportion to the maximum value of the three differential inputs. Operation of two decades (40 db) is shown from a 300 mV input peak-to-peak down to 3 mV peak-to-peak.

The disclosed system has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than or in addition to those described above. For example, as is well understood by those of skill in the art, various choices will be apparent to those of skill in the art. Further, the illustration of transistors and the associated connections, capacitors, etc., is exemplary; one of skill in the art will be able to select the appropriate number of transistors and related elements that is appropriate for a particular application.

These and other variations upon the embodiments are intended to be covered by the present disclosure, which is limited only by the appended claims.

TABLE 1

Definition of capacitor C2 and C3 values in FIG. 8
Cycles 1
Cnom 5.00E−14

| | | | C2 | C3 |
|---|---|---|---|---|
| 0 | 0 | 0.00E+00 | 0.00E+00 | 0.00E+00 |
| 1 | 0.19509 | 9.75E−15 | 9.75E−15 | 0.00E+00 |
| 2 | 0.382683 | 1.91E−14 | 1.91E−14 | 0.00E+00 |
| 3 | 0.55557 | 2.78E−14 | 2.78E−14 | 0.00E+00 |
| 4 | 0.707107 | 3.54E−14 | 3.54E−14 | 0.00E+00 |
| 5 | 0.83147 | 4.16E−14 | 4.16E−14 | 0.00E+00 |
| 6 | 0.92388 | 4.62E−14 | 4.62E−14 | 0.00E+00 |
| 7 | 0.980785 | 4.90E−14 | 4.90E−14 | 0.00E+00 |
| 8 | 1 | 5.00E−14 | 5.00E−14 | 0.00E+00 |
| 9 | 0.980785 | 4.90E−14 | 4.90E−14 | 0.00E+00 |
| 10 | 0.92388 | 4.62E−14 | 4.62E−14 | 0.00E+00 |
| 11 | 0.83147 | 4.16E−14 | 4.16E−14 | 0.00E+00 |
| 12 | 0.707107 | 3.54E−14 | 3.54E−14 | 0.00E+00 |
| 13 | 0.55557 | 2.78E−14 | 2.78E−14 | 0.00E+00 |
| 14 | 0.382683 | 1.91E−14 | 1.91E−14 | 0.00E+00 |
| 15 | 0.19509 | 9.75E−15 | 9.75E−15 | 0.00E+00 |
| 16 | 1.23E−16 | 6.13E−30 | 6.13E−30 | 0.00E+00 |
| 17 | −0.19509 | −9.75E−15 | 0.00E+00 | 9.75E−15 |
| 18 | −0.38268 | −1.91E−14 | 0.00E+00 | 1.91E−14 |
| 19 | −0.55557 | −2.78E−14 | 0.00E+00 | 2.78E−14 |
| 20 | −0.70711 | −3.54E−14 | 0.00E+00 | 3.54E−14 |
| 21 | −0.83147 | −4.16E−14 | 0.00E+00 | 4.16E−14 |
| 22 | −0.92388 | −4.62E−14 | 0.00E+00 | 4.62E−14 |
| 23 | −0.98079 | −4.90E−14 | 0.00E+00 | 4.90E−14 |
| 24 | −1 | −5.00E−14 | 0.00E+00 | 5.00E−14 |
| 25 | −0.98079 | −4.90E−14 | 0.00E+00 | 4.90E−14 |
| 26 | −0.92388 | −4.62E−14 | 0.00E+00 | 4.62E−14 |
| 27 | −0.83147 | −4.16E−14 | 0.00E+00 | 4.16E−14 |
| 28 | −0.70711 | −3.54E−14 | 0.00E+00 | 3.54E−14 |
| 29 | −0.55557 | −2.78E−14 | 0.00E+00 | 2.78E−14 |
| 30 | −0.38268 | −1.91E−14 | 0.00E+00 | 1.91E−14 |
| 31 | −0.19509 | −9.75E−15 | 0.00E+00 | 9.75E−15 |

TABLE 2

Excel sheet with Kaiser window function
Cycles 3
Cnom 5.00E−14 S are the sinusoidal values
Kalpha 2.00E+00 K is the amplitude of the window,
(Kalpha is the Kaiser window parameter, iOpia is an intermediate term in the Kaiser window calculation)
i0pia 8.71E+01 SK is the product of S and K, and
C2 and C3 are the capacitor values (they are SK multiplied by Cnom and set to zero if not positive)

| Index | S | K | SK | C2 | C3 |
|---|---|---|---|---|---|
| 0 | 0 | 1.15E−02 | 0.00E+00 | 0.00E+00 | 0.00E+00 |
| 1 | 0.55557 | 3.06E−02 | 8.51E−16 | 8.51E−16 | 0.00E+00 |
| 2 | 0.92388 | 6.01E−02 | 2.78E−15 | 2.78E−15 | 0.00E+00 |
| 3 | 0.980785 | 1.02E−01 | 4.98E−15 | 4.98E−15 | 0.00E+00 |
| 4 | 0.707107 | 1.56E−01 | 5.52E−15 | 5.52E−15 | 0.00E+00 |
| 5 | 0.19509 | 2.23E−01 | 2.18E−15 | 2.18E−15 | 0.00E+00 |
| 6 | −0.38268 | 3.03E−01 | −5.80E−15 | 0.00E+00 | 5.80E−15 |
| 7 | −0.83147 | 3.93E−01 | −1.63E−14 | 0.00E+00 | 1.63E−14 |
| 8 | −1 | 4.90E−01 | −2.45E−14 | 0.00E+00 | 2.45E−14 |
| 9 | −0.83147 | 5.90E−01 | −2.45E−14 | 0.00E+00 | 2.45E−14 |
| 10 | −0.38268 | 6.88E−01 | −1.32E−14 | 0.00E+00 | 1.32E−14 |
| 11 | 0.19509 | 7.81E−01 | 7.62E−15 | 7.62E−15 | 0.00E+00 |
| 12 | 0.707107 | 8.62E−01 | 3.05E−14 | 3.05E−14 | 0.00E+00 |
| 13 | 0.980785 | 9.27E−01 | 4.55E−14 | 4.55E−14 | 0.00E+00 |
| 14 | 0.92388 | 9.73E−01 | 4.50E−14 | 4.50E−14 | 0.00E+00 |
| 15 | 0.55557 | 9.97E−01 | 2.77E−14 | 2.77E−14 | 0.00E+00 |
| 16 | 3.68E−16 | 9.97E−01 | 1.83E−29 | 1.83E−29 | 0.00E+00 |
| 17 | −0.55557 | 9.73E−01 | −2.70E−14 | 0.00E+00 | 2.70E−14 |
| 18 | −0.92388 | 9.27E−01 | −4.28E−14 | 0.00E+00 | 4.28E−14 |
| 19 | −0.98079 | 8.62E−01 | −4.23E−14 | 0.00E+00 | 4.23E−14 |
| 20 | −0.70711 | 7.81E−01 | −2.76E−14 | 0.00E+00 | 2.76E−14 |
| 21 | −0.19509 | 6.88E−01 | −6.71E−15 | 0.00E+00 | 6.71E−15 |
| 22 | 0.382683 | 5.90E−01 | 1.13E−14 | 1.13E−14 | 0.00E+00 |
| 23 | 0.83147 | 4.90E−01 | 2.04E−14 | 2.04E−14 | 0.00E+00 |
| 24 | 1 | 3.93E−01 | 1.96E−14 | 1.96E−14 | 0.00E+00 |
| 25 | 0.83147 | 3.03E−01 | 1.26E−14 | 1.26E−14 | 0.00E+00 |
| 26 | 0.382683 | 2.23E−01 | 4.28E−15 | 4.28E−15 | 0.00E+00 |
| 27 | −0.19509 | 1.56E−01 | −1.52E−15 | 0.00E+00 | 1.52E−15 |
| 28 | −0.70711 | 1.02E−01 | −3.59E−15 | 0.00E+00 | 3.59E−15 |
| 29 | −0.98079 | 6.01E−02 | −2.95E−15 | 0.00E+00 | 2.95E−15 |
| 30 | −0.92388 | 3.06E−02 | −1.42E−15 | 0.00E+00 | 1.42E−15 |
| 31 | −0.55557 | 1.15E−02 | −3.19E−16 | 0.00E+00 | 3.19E−16 |

APPENDIX A

DSR Function and Supporting Functions

```
(defun mp-coefficients    (band-edges
                             &key
                             length                  ; if NIL will be optimized to meet anti-alias etc
                             fop                     ; rate of operation (ie step) in one-hot source in NIL calculated
                             (anti-alias-factor 4)   ; ratio of last band edge to image, ignored if length provided
                             (lowest-bin 3)          ; at least this number of minimum frequency cycles fit in the length
                             (phases 3)              ; phases per band - empirically even and >= 3
                             (poffset (/ pi phases)) ; initial phase offset prior to eqidistant phase from phases
                             (window : kaiser)       ; window function to use
                             (alpha 2.7) )           ; needed for kaiser window
  #. (format nil "Multiple band, multiple phase, coefficients. ~% ~
                  Returns three values: the coefficeints, calculated length and frequency of operation: ~% ~
                  ((p1-b1-coeff <p2-b1-coeff> ...) <(p1-b2-coeff <p2-b2-coeff> ...) ...) ~% fop and length")
    (let* ( ;; Step 1: Normalize the frequencies to the lowest bin: hence fmin is 'lowest-bin'
           (bsort (sort (copy-seq band-edges) #'<) )
           (factor (if fop (/ fop) (/ lowest-bin (elt bsort 0))))
           (band-edges (map 'list #' (lambda (x) (* x factor)) bsort))
```

APPENDIX A-continued

DSR Function and Supporting Functions

```
        ;; Step 2:   unless length is given, set length to achieve anti-alias-factor.
        ;;           ('anti-alias-factor' means the ratio of the lowest image to highest
        ;;           requested band edge. Since the lowest image is that of the highest
        ;;           edge, we need only to know the highest edge. [We could specify this
        ;;           given a rejecton factor and the analog AAF order, but for now lets
        ;;           pass it into this function]... )
        (length (or length (ceiling (* (1+ anti-alias-factor) (car (last band-edges))))))
        ;; Step 3: we can now make the window function:
        (windower (make-windower length window : alpha alpha)))
   (flet ( (divisor
            ;; Local function help 1: seek divisor closest to, but not greater than, 2.0:
            (f1 f2)
            (loop
               with delf = (abs (- f1 f2))
               for div from 1 to 1000        ; arbitarily large - not expected to be reached except in error
               as step = (/ delf div)
               when (<= step 2.0) return step))
          (sum-and-window
            ;; Local function help 2: sum over the frequencies with the phase-offset and window
            (freqs)
            (loop
              for i below phases
              with delphase = (/ (* 2 pi) phases)
              as phase = (+ poffset (* i delphase))
              collect
              (loop
for j below length
as coeff = (loop for f in freqs sum (sin (+ phase (* 2 pi j (/ f length)))))
as w = (funcall windower j)
collect (* w coeff)))))
      (let (;; Step 4: go though the band edges in pairs, creating a summation dependant on
            ;;       the step giving a number just less than 2...
            (chirps
              (loop
                for (lo hi) on band-edges
                while hi
                as divisor = (divisor lo hi)
                while divisor
                ;; The multiple of hi is to accomodate numerical error
                as frequencies = (loop for f from lo below (* 1.00001 hi) by divisor collect f)
                collect (sum-and-window frequencies))))
        (values chirps (/ length factor) length)))))
```

What is claimed is:

1. An apparatus for performing voice activity detection on a plurality of input signals, comprising:

a multiphase differential output rotating capacitive sampler configured to achieve a frequency down conversion over a plurality of frequency bands and to sample the plurality of input signals at a plurality of phases, the samples taken synchronously with the end of a chirp that is a sum of arbitrary frequencies across the plurality of frequency bands multiplied by a window function;

an amplitude detecting circuit configured to detect minimum and maximum values of the samples of the plurality of input signals in each frequency band and to determine a derivative of the samples;

a comparator configured to determine that a total energy in the plurality of input signals in any of the frequency bins based upon a derivative of the amplitude is great enough to indicate the presence of speech; and a switch configured to short the output to ground after each set of samples of the input signals is taken.

2. The apparatus of claim 1 wherein the amplitude detecting circuit is further configured to determine the derivative of the amplitude in each of the frequency bands based upon the determined minimum and maximum values of the input signals.

3. The apparatus of claim 1 wherein the rotating capacitive sampler is configured to achieve a frequency down conversion over 16 frequency bands.

4. The apparatus of claim 1 wherein the rotating capacitive sampler is configured to output samples of the plurality of input signals at three phases.

5. The apparatus of claim 1 wherein the capacitance values in the rotating capacitive sampler are selected based upon the desired frequency bands and desired window function.

6. The apparatus of claim 5 wherein the window function is a Kaiser window function.

7. The apparatus of claim 1 wherein the rotating capacitive sampler is comprised of an aggregation of bottom plate samplers, each bottom plate sampler comprising two capacitors and a switch, the capacitor values selected based upon the desired frequency bands and a desired window function.

8. The apparatus of claim 7 wherein the window function is a Kaiser window function.

9. A method of performing voice activity detection on a plurality of input signals, comprising:

creating a multiphase differential output rotating capacitive sampler configured to achieve a frequency down conversion over a plurality of frequency bands and to sample the input signals at a plurality of phases;

creating a chirp in the rotating capacitive sampler as the sum of arbitrary frequencies across the plurality of frequency bands multiplied by a window function;

sampling the input signals synchronous with an end of the chirp;

determining an amplitude of the input signals in each of the plurality of frequency bins and a derivative of the amplitude in each of the frequency bins;

determining that a total energy in the input signals in each of the frequency bins based upon the derivative of the amplitude is great enough to indicate the presence of a voice; and restoring a voltage offset by shorting any output to ground after each set of samples is taken.

10. The method of claim 9 wherein the plurality of phases is three phases.

11. The method of claim 9 wherein the plurality of frequency bands is sixteen frequency bands.

12. The method of claim 9 wherein determining an amplitude of the input signals in each of the plurality of frequency bands further comprises:

determining minimum and maximum values of the plurality of input signals in each of the frequency bands; and wherein determining the derivative of the amplitude in each of the frequency bands is based upon the determined minimum and maximum values of the plurality of input signals.

13. The method of claim 9 wherein the capacitance values in the rotating capacitive sampler are selected based upon the desired frequency bins and desired window function.

14. The method of claim 13 wherein the window function is a Kaiser window function.

* * * * *